United States Patent
Engström et al.

(10) Patent No.: US 10,750,393 B2
(45) Date of Patent: Aug. 18, 2020

(54) WIRELESS DEVICE, FIRST NETWORK NODE, AND METHODS PERFORMED THEREBY TO HANDLE A LOG OF INFORMATION ABOUT A SET OF BEAMS

(71) Applicant: Telefonaktiebolaget LM Ericsson (publ), Stockholm (SE)

(72) Inventors: Stefan Engström, Linköping (SE); Icaro L. J. da Silva, Solna (SE); Fredrik Gunnarsson, Linköping (SE); Helka-Liina Määttanen, Helsinki (FI); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 201 days.

(21) Appl. No.: 15/758,624

(22) PCT Filed: Dec. 22, 2017

(86) PCT No.: PCT/SE2017/051336
§ 371 (c)(1),
(2) Date: Mar. 8, 2018

(87) PCT Pub. No.: WO2019/125261
PCT Pub. Date: Jun. 27, 2019

(65) Prior Publication Data
US 2019/0200250 A1   Jun. 27, 2019

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04W 16/28* (2013.01); *H04W 72/046* (2013.01)

(58) Field of Classification Search
CPC ... H04W 24/10; H04W 72/046; H04W 16/28; H04B 7/0617
See application file for complete search history.

(56) References Cited

U.S. PATENT DOCUMENTS

| 2017/0223552 A1 | 8/2017 | Roy et al. |
| 2017/0359106 A1 | 12/2017 | Wilson et al. |

(Continued)

FOREIGN PATENT DOCUMENTS

| EP | 3285517 A1 | 2/2018 |
| WO | 2017134499 A1 | 8/2017 |

*Primary Examiner* — Moo Jeong
(74) *Attorney, Agent, or Firm* — Coats & Bennett, PLLC

(57) ABSTRACT

Method performed by a wireless device (130) operating in a wireless communications network (100) wherein a plurality of beams (121) is transmitted by one or more network nodes (111, 113, 114) in the wireless communications network (100). The wireless device (130) generates (602) a log over a period of time. The log comprises: a) information about a first set of beams (122) in the plurality of beams (121) detected by the wireless device (130), and b) a time of detection. The log comprises the information and the time of detection for both of: i) a first set of time periods when the wireless device (130) was in a connected state in the wireless communications network (100), and ii) a second set of time periods when the wireless device (130) lacked a connection in the wireless communications network (100). The wireless device (130) sends (605) the generated log to a first network node (111).

33 Claims, 18 Drawing Sheets

(51) Int. Cl.
*H04W 16/28* (2009.01)
*H04W 72/04* (2009.01)

(56) References Cited

U.S. PATENT DOCUMENTS

2019/0116500 A1* 4/2019 Bendlin .............. H04W 64/003
2019/0174337 A1* 6/2019 Prasad ................... H04B 7/088
2019/0223174 A1* 7/2019 Shimizu ............ H04W 72/0446

* cited by examiner a)

b)

a)

b)

WIRELESS DEVICE, FIRST NETWORK NODE, AND METHODS PERFORMED THEREBY TO HANDLE A LOG OF INFORMATION ABOUT A SET OF BEAMS

TECHNICAL FIELD

The present disclosure relates generally to a wireless device and methods performed thereby for handling a log of information about a set of beams. The present disclosure also relates generally to a first network node, and methods performed thereby for handling a log of information about a set of beams. The present disclosure further relates generally to a computer program product, comprising instructions to carry out the actions described herein, as performed by the wireless device, or the first network node. The computer program product may be stored on a computer-readable storage medium.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the Radio Access Network (RAN), with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., New Radio Node B (gNB), evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) New Radio (NR), base stations, which may be referred to as gNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Radio Network Architecture

The 3GPP is currently working on standardization of the $5^{th}$ generation of a mobile radio access system, also called Next Generation Radio Access Network (NG-RAN). FIG. 1 is a schematic diagram illustrating an example of a Next-Generation RAN architecture. The NG-RAN may include nodes providing radio connections according to the standard for New Radio (NR), as well as nodes providing radio connections according to the Long-Term Evolution (LTE) standard. The NG-RAN may be connected to some network that may provide non-access stratum functions and connection to communication networks outside NR, such as the internet. This is here depicted in FIG. 1 as the 5G Core network (5GC), which comprises core network nodes Access and Mobility Management Function (AMF) and User Plane Function (UPF), as specified by 3GPP. As also depicted in FIG. 1, the different base stations, either gNB or Next Generation Evolved Node Bs (ng-eNBs) may be communicate with each other via a Xn interface, and with the core network nodes via Next Generation (NG) interfaces.

An evolved architecture for the RAN is foreseen, both for the LTE and the NR tracks of 5G. This includes a solution where the radio base stations may be split into parts for radio network control through Radio Control Units (RCUs) 21, packet processing through Packet Processing Units (PPUs) 22, Radio Rodes (RNs) with base-band processing through Radio Processing Units (RPUs) 23 and Radio Units (RU) 24. An example of the new architecture is shown in FIG. 2, indicating possible interfaces. The RCUs 21 and PPUs 22 are connected to the core network nodes 25 in the Core network.

The main task of a mobile radio network may be understood as that to provide good radio connections for mobile wireless devices to carry the services the users of the wireless devices may want to utilize. This process may be understood to involve finding the most suitable cells or antenna beams, which are herein simply referred to as beams, for every wireless device as it moves around. A beam may be understood as a spatial confinement of a radio transmission, which may refer to a narrow or wide angular spread of a power emitted from an antenna. This is today performed by requesting the wireless devices to measure strength and quality of radio signals from the serving beams, as well from neighbour beams. The results of the measurements are reported to the RAN, which may then take a decision on what beams may serve the mobile in the following. FIG. 3 is a schematic diagram illustrating a wireless device 31, in this particular example a User Equipment (UE), moving from a first cell 32 covered by a first group of beams 33 served by a serving gNB 34 to a second cell 35 covered by a second group of beams 36 served by a second gNB 37.

The performance of measurements involved in the process of providing radio coverage to a moving wireless device in a mobile radio network comprising beams involves the usage a great number of radio resources, reducing the capacity of a communications network, increasing its latency and consuming energy on the network side and the on the wireless device. This is particularly relevant for the wireless device, since it may drain battery, increasing the risk for a dropped connection. Moreover, the available bitrates will be lowered if the wireless device remains under poor coverage for a long time while it is performing the measurements.

SUMMARY

It is an object of embodiments herein to improve the management of mobility of a wireless device in a wireless communications network. It is a particular object of embodiments herein to improve the management of mobility of a wireless device in a wireless communications network comprising a plurality of beams.

According to a first aspect of embodiments herein, the object is achieved by a method, performed by a wireless device. The wireless device operates in a wireless communications network wherein a plurality of beams is transmitted by one or more network nodes operating in the wireless communications network. The wireless device generates a log over a period of time. The log comprises information about a first set of beams in the plurality of beams detected by the wireless device. The log also comprises a time of detection, by the wireless device, of the first set of beams. The log comprises the information and the time of detection for both of: i) a first set of time periods when the wireless device was in a connected state in the wireless communications network, the first set of time periods being comprised in the period of time, and ii) a second set of time periods when the wireless device lacked a connection in the wireless communications network, the second set of time periods being comprised in the period of time. The wireless device also sends the generated log to a first network node operating in the wireless communications network.

According to a second aspect of embodiments herein, the object is achieved by a method, performed by a first network node. The first network node operates in the wireless communications network, wherein the plurality of beams is transmitted by the one or more network nodes operating in the wireless communications network. The first network node receives, from at least one wireless device operating in the wireless communications network, the log generated over the period of time. The log comprises the information about the first set of beams detected by the wireless device. The first set of beams is comprised in the plurality of beams. The log also comprises the time of detection, by the wireless device, of the first set of beams. The log comprises the information and the time of detection for both of: i) the first set of time periods when the wireless device was in the connected state in the wireless communications network, the first set of time periods being comprised in the period of time, and ii) the second set of time periods when the wireless device lacked a connection in the wireless communications network, the second set of time periods being comprised in the period of time. The first network node determines, based on the received log, at least one of: a set of reference signals and a second set of beams, the wireless device or another wireless device operating in the wireless communications network is predicted to detect in a future time period, and is to at least one of: a) provide a report on to the first network node and b) evaluate for beam selection when not being connected to the wireless communications network.

According to a third aspect of embodiments herein, the object is achieved by the wireless device, configured to operate in the wireless communications network wherein the plurality of beams is configured to be transmitted by the one or more network nodes configured to operate in the wireless communications network. The wireless device is further configured to generate the log over the period of time. The log is configured to comprise the information about the first set of beams in the plurality of beams configured to be detected by the wireless device, and the time of detection, by the wireless device, of the first set of beams. The log is further configured to comprise the information and the time of detection for both of: i) the first set of time periods when the wireless device was in the connected state in the wireless communications network, the first set of time periods being comprised in the period of time, and ii) the second set of time periods when the wireless device lacked a connection in the wireless communications network, the second set of time periods being comprised in the period of time. The wireless device is also configured to send the generated log to the first network node configured to operate in the wireless communications network.

According to a fourth aspect of embodiments herein, the object is achieved by the first network node configured to operate in the wireless communications network, wherein the plurality of beams is configured to be transmitted by the one or more network nodes configured to operate in the wireless communications network. The first network node is further configured to receive, from the at least one wireless device configured to operate in the wireless communications network, the log configured to be generated over the period of time. The log is configured to comprise the information about a first set of beams configured to be detected by the wireless device. The first set of beams is configured to be comprised in the plurality of beams. The log also comprises the time of detection, by the wireless device, of the first set of beams. The log is further configured to comprise the information and the time of detection for both of: i) the first set of time periods when the wireless device was in the connected state in the wireless communications network, the first set of time periods being comprised in the period of time, and ii) the second set of time periods when the wireless device lacked a connection in the wireless communications network, the second set of time periods being comprised in the period of time. The first network node is further configured to determine, based on the log configured to be received, at least one of: the set of reference signals and the second set of beams, the wireless device or another wireless device configured to operate in the wireless communications network is configured to be predicted to detect in the future time period, and is to at least one of: a) provide the report on to the first network node and b) evaluate for beam selection when not being connected to the wireless communications network.

According to a fifth aspect of embodiments herein, the object is achieved by a computer program, comprising instructions which, when executed on at least one processor, cause the at least one processor to carry out the method performed by the wireless device.

According to a sixth aspect of embodiments herein, the object is achieved by a computer-readable storage medium, having stored thereon the computer program, comprising instructions which, when executed on at least one processor, cause the at least one processor to carry out the method performed by the wireless device.

According to a seventh aspect of embodiments herein, the object is achieved by a computer program, comprising instructions which, when executed on at least one processor, cause the at least one processor to carry out the method performed by the first network node.

According to an eighth aspect of embodiments herein, the object is achieved by a computer-readable storage medium, having stored thereon the computer program, comprising instructions which, when executed on at least one processor, cause the at least one processor to carry out the method performed by the first network node.

By the wireless device generating the log comprising the information and the time of detection collected when the wireless device was in connected and when the wireless device lacked a connection to the wireless communications network, and then sending the generated log to the first network node, the wireless device enables the first network node to determine the set of reference signals and the second set of beams the wireless device or another wireless device is likely to detect in the future, which in turn enables the first network node to indicate to the wireless device which reference signals and beams to provide a report on and to evaluate for beam selection when not being connected. Hence, the number of measurements a wireless device may have to measure on may be decreased, which reduces in turn the time to find the best candidate beams and the time the wireless device may have to spend with a non-optimal radio connection. This enables to increase bitrates, and decrease the latency and the risk for a dropped connection. Furthermore, the first network node, by receiving the log is also enabled to determine when and where additional downlink signals may be broadcasted so a wireless device may measure on them.

BRIEF DESCRIPTION OF THE DRAWINGS

Examples of embodiments herein are described in more detail with reference to the accompanying drawings, and according to the following description.

DETAILED DESCRIPTION

Figure 1:
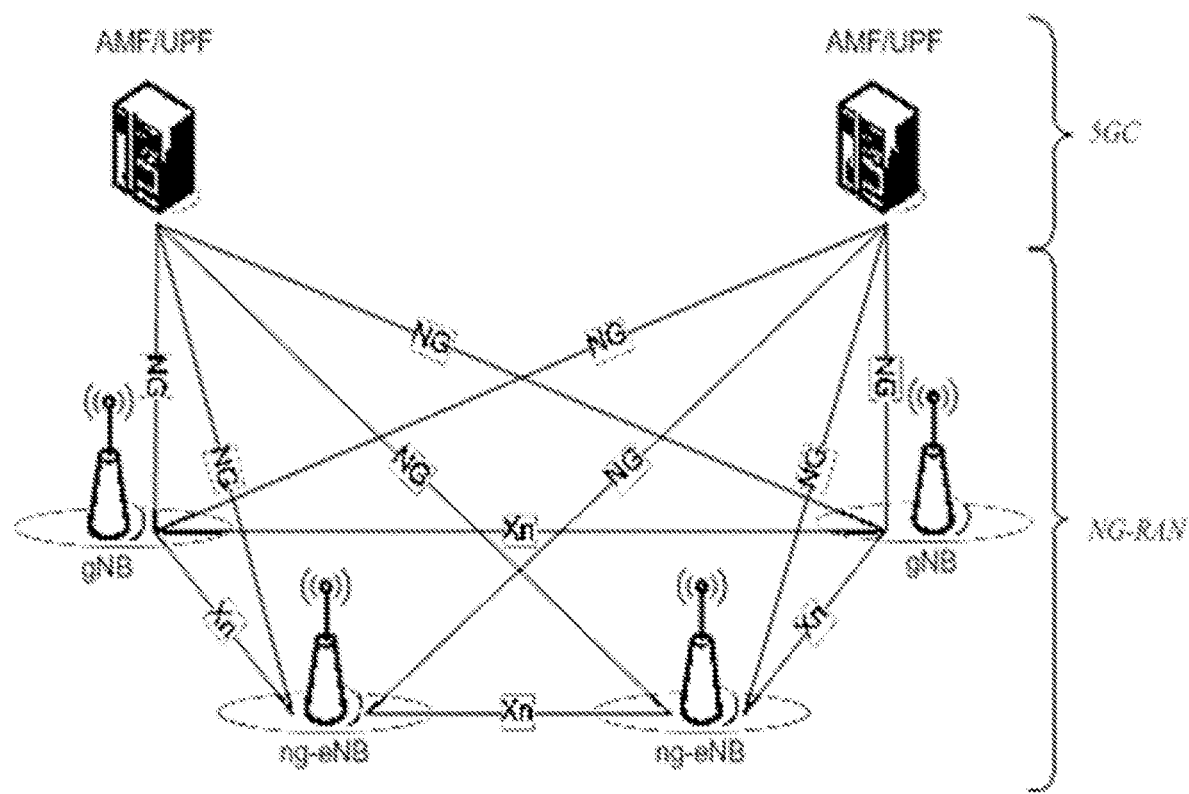
FIG. 1 is a schematic diagram illustrating an example of an NG RAN architecture, according to existing methods.
Figure 2:
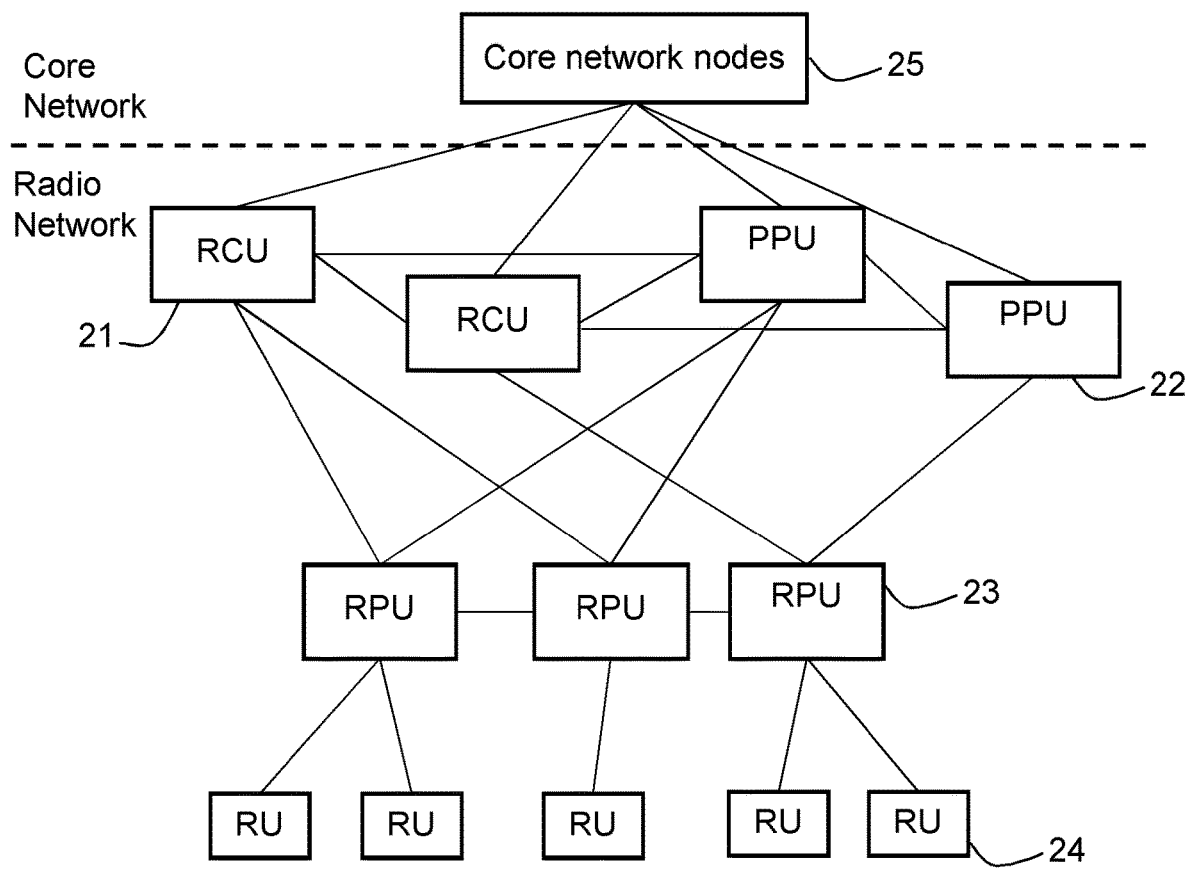
FIG. 2 is a schematic diagram illustrating another example of an NG-RAN architecture, according to existing methods.
Figure 3:
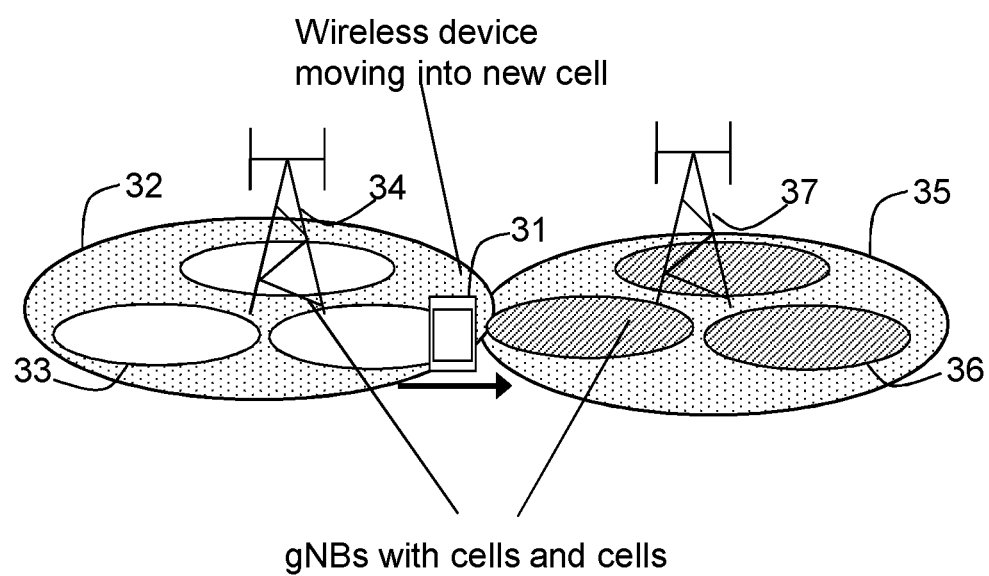
FIG. 3 is a schematic diagram illustrating an example of a UE moving between two cells controlled by different gNBs, according to existing methods.
Figure 4:
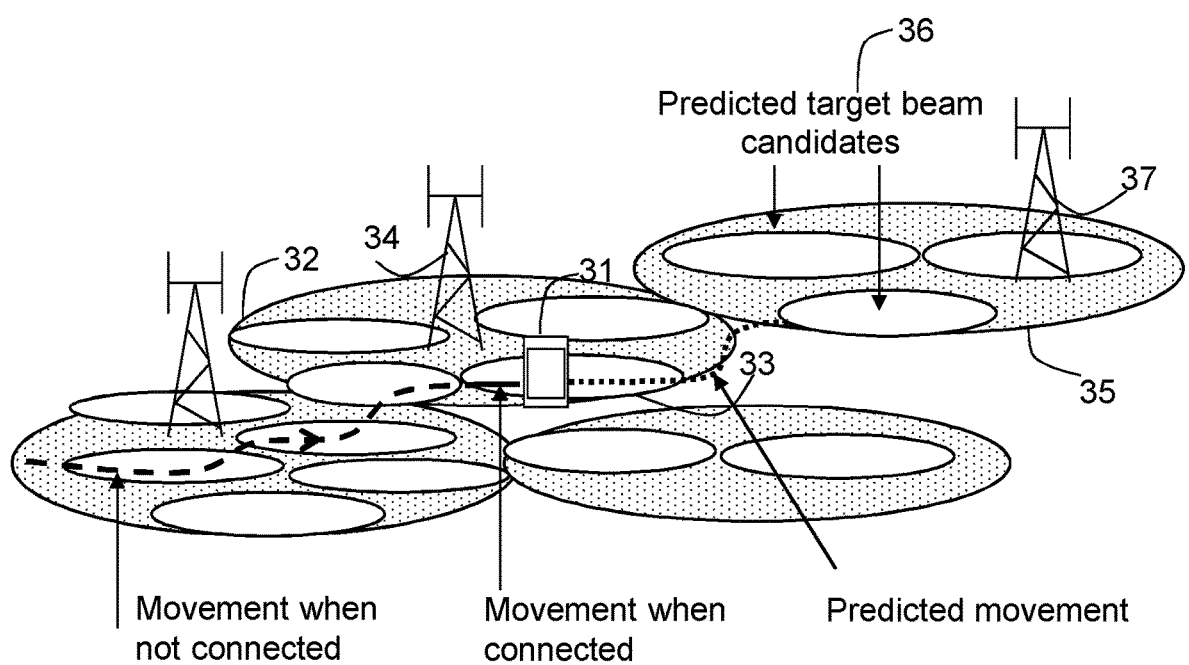
FIG. 4 is a schematic diagram illustrating an example showing a mobile moving between beams in a wireless communications network.

As part of the development of embodiments herein, one or more problems with the existing technology will first be identified and discussed.

With the introduction of NR and massive beamforming in the RAN, the task of performing measurements of radio signals for mobility purposes for the wireless devices will be bigger. There will be more possible beams to measure on, and on different frequencies. The always broadcasted signals on which the mobiles measure, will be more sparse, to save energy and reduce interference. The foregoing means that the wireless devices will have to measure on more candidates for a longer time, which will impact the time to find the best candidate beams and the time the wireless devices will have to spend with a non-optimal radio connection, lowering the available bitrates, increasing the latency and increasing the risk for a dropped connection.

Additional downlink signals may be introduced for the wireless devices to measure on, to make estimates of the radio channel in different candidate beams. These signals are, however, not always broadcasted and the wireless device may need to be configured by the RAN to find these signals. It may only be possible for the wireless device to evaluate a subset of the possible candidate beams by using these additional signals, due to that the time to perform measurements may be limited or due to that the network may not have broadcasted signals for measurement in all suitable beams, which may result in that the best beams are not used for the wireless device.

Borders between cells and beams are not uniform since radio propagation may be affected by many different objects and different thresholds for changing serving beams may be suitable at different locations at the border because fall or rise in signal quality, when moving, may be differently large in different locations. With the introduction of massive beamforming, the borders will become even more varied and different thresholds may be good at different locations.

In order to limit the amount of measurements of radio signals a wireless device may need to perform, it may be useful to narrow down the list of beams to measure on to those located in an area the wireless device is likely to visit. For that purpose, estimating where a wireless device is located and where it may be going, may be useful. In order to estimate where a wireless device may be going, knowledge of its own recent movements may be very useful. FIG.

4 schematically illustrates this by showing a wireless device 31 moving while connected to a serving gNB 34 via a first group of beams 33 in a first cell 32. The selection of target beams, the second group of beams 36 served by the second gNB 37 in the second cell 35, may be based on the movements of the wireless device between different beams up till the present. Today, such knowledge is only available for the latest period during which the wireless device has been connected to the RAN, e.g., has been in Radio Resource Control (RRC)_CONNECTED state. However, most of the time, most wireless devices are not connected to the network, but are moving while lacking a connection to the network, and therefore moving between beams in a way unknown to the network. Hence, according to existing methods, it is not possible for the network to use these movements of the wireless devices between beams while lacking a connection to the network, to predict the most probable target beams.

This results in the estimates of the movements of the wireless device being rather restricted, and having a poor predictive value.

Certain aspects of the present disclosure and their embodiments may provide solutions to this challenge or other challenges. There are, proposed herein, various embodiments which address one or more of the issues disclosed herein.

Particular embodiments herein may be understood to address this problem in existing methods by enabling the wireless device to create a log of its movements between beams, when it is and when it is not connected to the network, and then make this report available to the network when it again connects to the network. This may be then be used to predict the movements of the same wireless device, or of other wireless devices in the wireless communications network. Particular embodiments herein may be understood to relate to a history log in a RAN.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 5:
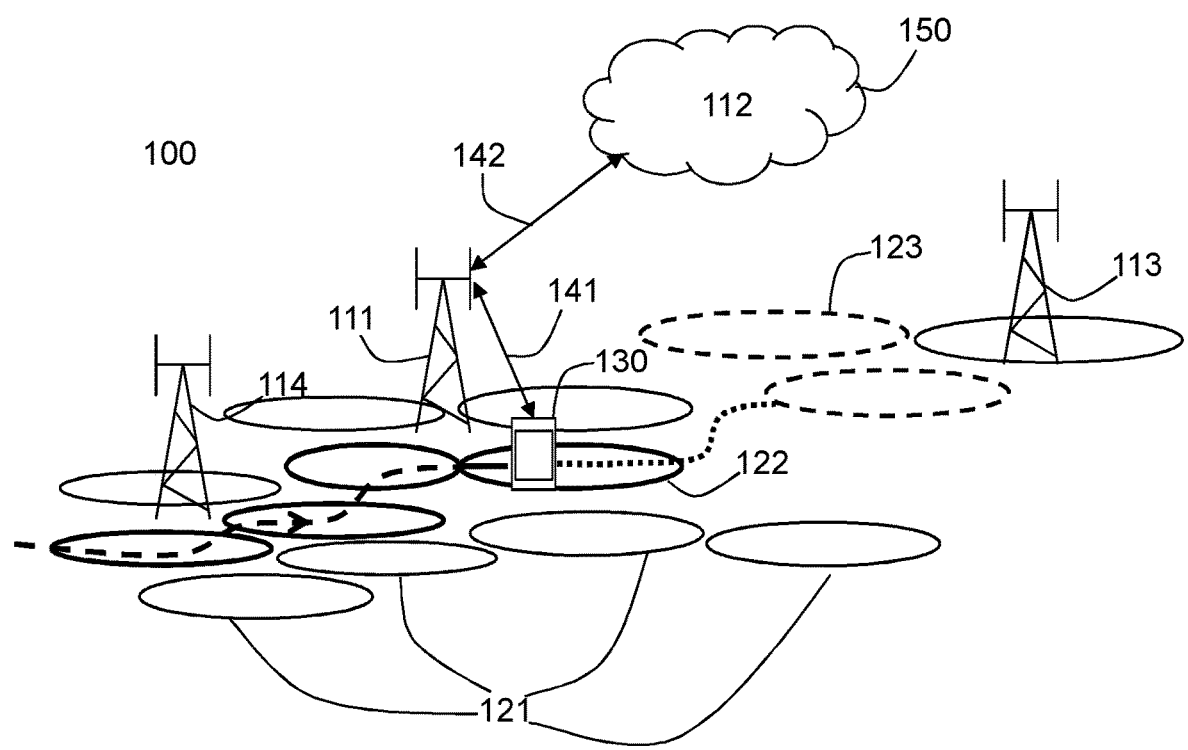
FIG. 5 is a schematic diagram illustrating a wireless communications network, according to embodiments herein.

FIG. 5 depicts a non-limiting example of a wireless communications network 100, sometimes also referred to as a telecommunications network, wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system.

The wireless communications network 100 comprises a plurality of network nodes, whereof a first network node 111 and a second network node 112 are depicted in the non-limiting example of FIG. 5. The first network node 111 is a radio network node. That is, a transmission point such as a radio base station, for example a New Radio (NR) NodeBs (gNBs), an eNB, or any other network node with similar features capable of serving a wireless device, such as a user equipment or a machine type communication device, in the wireless communications network 100. The first network node 111 is therefore one of one or more radio network nodes 111, 113, 114 comprised in the wireless communications network 100. In the particular non-limiting example of FIG. 5, the one or more radio network nodes 111, 113, 114 comprise the first network node 111, a third network node 113, and a fourth network node 114. The second network node 112 may also be a radio network node, or it may be a virtual node in the cloud, as in the example depicted in the non-limiting example of FIG. 5. Alternatively, the second network node 112 may be a core network node, or an Operation and Maintenance (OaM) system.

Any of the second network node 112, the third network node 113, and the fourth network node 114 may be referred to as another network node 112, 113, 114.

The wireless communications network 100 covers a geographical area which may be divided into cell areas, wherein each cell area may be served by a network node, although, one radio network node may serve one or several cells. Each of the cells in the wireless communications network 100 may be covered by one or more beams. In the wireless communications network 100, the one or more radio network nodes 111, 113, 114 transmit a plurality of beams 121. A first set of beams 122 and a second set of beams 123 are comprised in the plurality of beams 121. The first set of beams 122, depicted in FIG. 5 as circles with a bold outline, and the second set of beams 123, depicted in FIG. 5 as circles with a dashed outline, will be described later. Any of the one or more radio network nodes 111, 113, 114 may be of different classes, such as, e.g., macro eNodeB, home eNodeB or pico base station, based on transmission power and thereby also cell size. Any of the one or more radio network nodes 111, 113, 114 may support one or several communication technologies, and its name may depend on the technology and terminology used. In NR, any of the one or more radio network nodes 111, 113, 114, which may be referred to as a gNB, may be directly connected to one or more core networks, which are not depicted in FIG. 5 to simplify the Figure. In some examples, any of the one or more radio network nodes 111, 113, 114 may be a distributed node, and it may perform some of its functions partially in collaboration with a virtual node in the cloud. In the non-limiting example of FIG. 5, the first network node 111 and the second network node 112 are implemented as a distributed node, wherein the first network node 111 is a gNB, and the second network node 112 is a virtual node in the cloud 150.

A plurality of wireless devices are located in the wireless communication network 100, whereof a wireless device 130, which may also be referred to as a device, is depicted in the non-limiting example of FIG. 5. The wireless device 130 comprised in the wireless communications network 100 may be a wireless communication device such as a UE, or a 5G UE, which may also be known as e.g., a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The wireless device 130 may be configured to communicate within the wireless communications network 100 with the first network node 111 over a first link 141, e.g., a radio link. The first network node 111 may be configured to communicate within the wireless communications network 100 with the second network node 112 over a second link 142, e.g., a radio link, or a wired link.

In the non-limiting example of FIG. 5, the wireless device 130 has moved along the bold, dashed curved line, and it is predicted to move in the direction of the arrow head, along the path of the bold, dotted line.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Note that although terminology from 5G/NR and LTE has been used in this disclosure to exemplify the embodiments herein, this should not be seen as limiting the scope of the embodiments herein to only the aforementioned system. Other wireless systems with similar features, may also benefit from exploiting the ideas covered within this disclosure.

In general, the usage of "first", "second", "third", and/or "fourth" herein may be understood to be an arbitrary way to denote different elements or entities, and may be understood to not confer a cumulative or chronological character to the nouns they modify.

Figure 6:
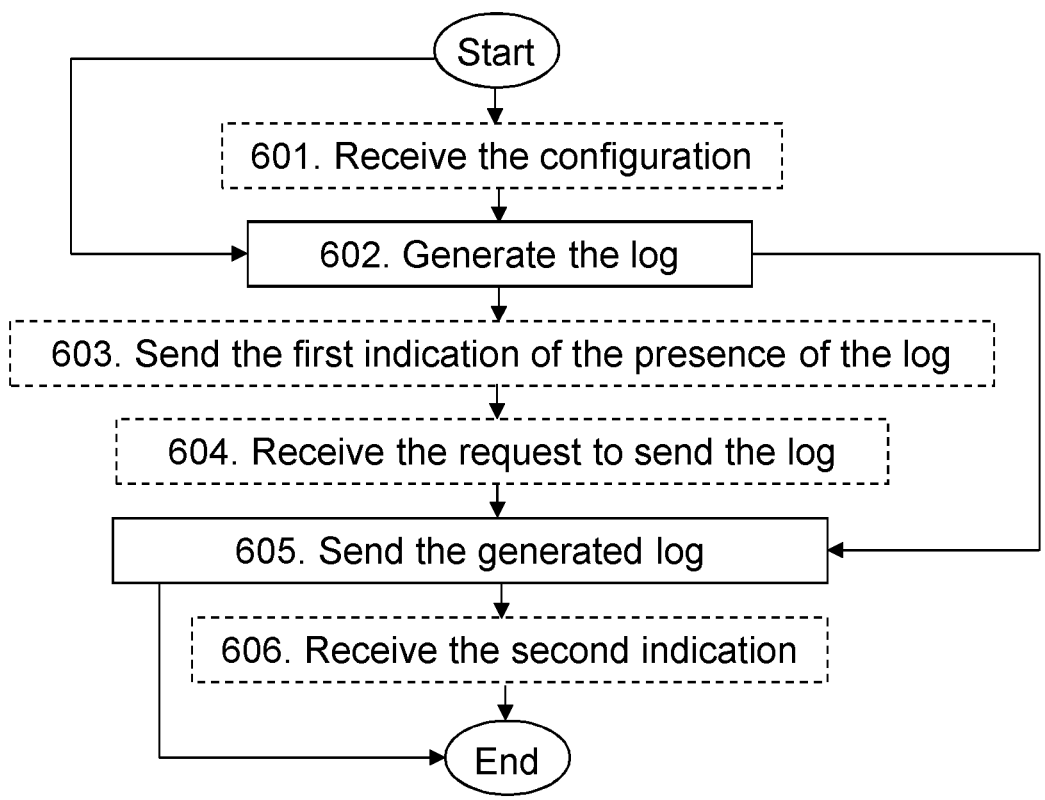
FIG. 6 is a flowchart depicting a method in a wireless device, according to embodiments herein.

Embodiments of method performed by the wireless device 130, will now be described with reference to the flowchart depicted in FIG. 6. The wireless device 130 operates in the wireless communications network 100, wherein the plurality of beams 121 is transmitted by the one or more radio network nodes 111, 113, 114 operating in the wireless communications network 100.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, optional actions are indicated with dashed boxes.

Action 601

In order to ultimately enable the first network node 111 to narrow down the list of beams the wireless device 130 may need to measure on, to those located in an area the wireless device 130 is predicted to visit, the wireless device 130 may, according to embodiments herein, log information, which may be understood in other words as specified data, when being connected and not being connected to a RAN, e.g., the first network node 111, in the wireless communications network 100.

What information to gather in the log may be specified to the wireless device 130 via a configuration by the the first network node 111, by the second network node 112, by another node operating in the wireless communications network 100, or by an internal function in the wireless device 130.

According to the foregoing, in some embodiments, the wireless device 130 may, in this Action 601, receive the configuration. In some particular embodiments, the wireless device 130 may, in this Action 601, receive the configuration from the first network node 111, or from the second network node 112 operating in the wireless communications network 100. The configuration may configure the wireless device 130 with at least one of: a) the type of information to be added to the log, b) an amount of information to be added to the log, that is, how much information to add to the log, c) a time when the information is to be added to the log, d) a first condition to be met for the information to be added to the log, for example, an event that may have to occur for the information to be added, e) a periodicity with which the information is to be added to the log, namely how often the information may need to be added to the log, and f) a second condition indicating when the added information is to be removed from the log.

The receiving in this Action 601 may be performed, e.g., via the first link 141.

The information that the wireless device 130 may gather in the log may be of different types, that is, the information may comprise different types of variables. The types of information may be, for example, information on what nodes, cells and beams the wireless device 130 has been connected to or camped on. Examples of such information may be physical cell identities (IDs), cell global IDs, beam IDs, etc.

The type of information may be, e.g., a type of measurements to perform. The type of measurements the wireless device 130 may perform to log movements may be based on the detection of particular signals, e.g., Synchronization Signal (SS)/Physical Broadcast Channel (PBCH) block(s) that may be monitored while the wireless device 130 is in idle and/or inactive state e.g., to perform cell reselection. Hence, the wireless device 130 may log detected SS/PBCH block indexes and measurement values such as Reference Signal Received Power (RSRP), Reference Signal Received Quality (RSRQ), Reference Signal to Interference Noise Ratio (RS-SINR), etc.

There may be some detailed configurations, such as, for example, the type of information may be to only log the strongest beams, the strongest plus a specified number being the strongest above a threshold or all above a given threshold, for all detected cells. The type of information may also be the exact measurement information to be logged, for example, Physical-layer Cell Identity (PCI), SS/PBCH block index, one or multiple measurement quantities per SS/PBCH block index such as SS-RSRQ, SS-RSRP, SS-SINR, etc. . . . .

The configuration may also configure the wireless device 130 with when to log the information, that is, the time when the information is to be added to the log. For example, times when entering and leaving specified beams or cells, only when an actual cell reselection is performed, or when the best beam changes. Alternatively, the configuration may configure the wireless device 130 to log the type of information periodically or periodically in combination with the first condition to be met for the information to be added to the log, for example, periodically, but only when a condition is met for the information to be added to the log, such as only when a neighbor cell is within a threshold of a cell the wireless device 130 may be currently camping on, to e.g., get more handover border statistics. The configuration may also configure the periodicity of measurements, and/or the time window during which the wireless device 130 may need to perform these.

Regarding the first condition to be met for the information to be added to the log, the configuration may configure the wireless device 130 to add the information to the log only between a time the wireless device 130 was moved to idle/inactive state until the time when the wireless device 130 may enter connected mode. The configuration may also configure the wireless device 130 to perform measurements based on Cell Specific Information Reference Signals (CSI-RS) configured resources while in inactive/idle state.

Further examples of logged information may be timing advance, radio node radio beam directions, and radio node (RN) antenna directions.

How much logged information, e.g. for how long time or how big amount of data or how many cells and beams, that may be kept in the wireless device 130 may also be specified to the wireless device 130 by the RAN, by an OaM system, by another node or by an internal function in the wireless device 130. It may also be specified to the wireless device 130 whether or not it may need to remove logged data after it may have been transmitted to the network.

The information that may be gathered by the wireless device 130 may be information about the first set of beams 122, which are the beams in the plurality of beams 121 detected by the wireless device 130. These may be understood as the beams covering the geographical path that may be followed by the wireless device 130 during its movement in space, as illustrated in FIG. 5 by the circles with bold outlines.

The information about the first set of beams 122 may be referred to herein as first information. According to the foregoing, in embodiments wherein the information is the first information, the type of information of the first information, may comprise one or more indicators of at least one of: a) an identifier for each of the beams in the first set of beams 122, b) a cell identifier associated with each of the beams in the first set of beams 122, c) an identifier of the one or more radio network nodes 111, 113, 114 transmitting each of the beams in the first set of beams 122, d) a strength, e.g., RSRP, of a signal in a beam, e) a quality, e.g., RSRQ, of a signal in a beam, f) a timing advance used when transmitting in uplink, and g) an interference level, e.g., the signal to interference ratio for the Synchronization Signal, SS-SINR.

Optionally, along with the information already mentioned, the wireless device 130 may also gather additional information, which may be referred to herein as second information. The second information may comprise at least one of: a) a speed of the wireless device 130, b) a type of reference signals detected by the wireless device 130, and c) a number of reference signals of a certain type detected by the wireless device 130.

The speed of the wireless device 130 may be a current speed of the wireless device 130 as estimated by the wireless device 130. Using this, it may be estimated what 'type of mobility' may be more common in an area: pedestrian, vehicle etc. The speed estimation may e.g., be based on mobility state estimation of idle mode or Global Navigation Satellite System (GNSS) data.

Other examples of information that may be logged may be the strength and quality of downlink signals in beams where the mobile has been connected or has camped or from neighbour beams. Examples of downlink signals may be synchronization signals, positioning signals, channel-state information reference signals.

The configuration for these movements logs may be received in this Action 601, e.g., when the wireless device 130 may move from RRC_CONNECTED to RRC_INACTIVE (or RRC_IDLE), e.g., in a release and/or suspended message or when the wireless device 130 may move from RRC_INACTIVE (or RRC_IDLE) to RRC_CONNECTED, e.g., in a connection setup or connection re-configuration message.

Action 602

In this Action 602, the wireless device 130 generates the log over a period of time. The log comprises: a) the information about the first set of beams 122 in the plurality of beams 121 detected by the wireless device 130, that is, the first information, and b) a time of detection, by the wireless device 130, of the first set of beams 122. The log comprises the information and the time of detection for both of: i) a first set of time periods when the wireless device 130 was in a connected state in the wireless communications network 100, the first set of time periods being comprised in the period of time, and ii) a second set of time periods when the wireless device 130 lacked a connection in the wireless communications network 100, the second set of time periods being comprised in the period of time.

To generate a log may be understood to comprise collecting or gathering the information, and then storing the collected information in a memory.

The connected state, as used herein, may be understood as that the network is aware of which beams in the network are used to communicate with the wireless device 130 and may be, for example, an RRC_CONNECTED state. To lack a connection may be understood as that the network is not aware of what beams may need to be suitable for communication with the wireless device 130. For example, the wireless device 130 may lack a connection when in RRC_INACTIVE state, RRC_IDLE state, lightly connected state, or in dormant state.

In some examples, the wireless device 130 may generate the log based on the configuration that it may have received in Action 601. Alternatively, or in combination with the received configuration, the wireless device 130 may generate the log according to an internal pre-configuration.

Action 603

Once the log has been generated, as an option, the wireless device 130 may indicate the presence of the log to the first network node 111. Accordingly, in this Action 603, the wireless device 130 may send, to the first network node 111 or any of the one or more network nodes 113, 114, a first indication indicating a presence of the log. The sending in this Action 603 may be performed, e.g., via the first link 141. The first indication may be, for example, in an RRC Connection Request, RRC Connection Setup Complete, RRC Connection Resume Request, RRC Connection Resume Complete, RRC Connection Reestablishment Request or RRC Connection Reestablishment Complete message.

Action 604

In this Action 604, the wireless device 130 may receive, from the first network node 111, a request to send the log. The receiving in this Action 604 may be performed, e.g., via the first link 141.

The wireless device 130 may, for example, receive the request to send the log in response to having sent the first indication to the first network node 111 in Action 603.

Action 605

The logged information may then be reported to the RAN to be used to select the best beams for the mobile. In this Action 605, the wireless device 130, sends the generated log to the first network node 111 operating in the wireless communications network 100.

The sending in this Action 605 may be performed, e.g., via the first link 141.

The wireless device 130, for example, may send the generated log to the first network node 111 after receiving the request to send the log from the first network node 111, according to Action 604.

The wireless device 130 may transmit the log to the first network node 111, e.g., when the wireless device 130 may connect to the network.

Action 606

In order for the RAN in the wireless communications network 100, e.g., via the first network node 111, to be able to ultimately select the best beams to provide coverage to the wireless device 130, the wireless device may have to measure specific downlink signals in a number of so-called candidate target beams. For the measurements to be successful, the signals may have to be sent out in the candidate target beams and the wireless device may need to have the opportunity to perform the measurements within as short a time as possible. This may be understood to be because, during the measurement time, the present channel may deteriorate to such extent that the connection may be dropped, or so that the bitrate may be lowered significantly. To support this, the RAN may need to be able to select the most probable target beams, send out the additional signals in these beams and request the wireless device 130 to measure and report the results from this set of selected target beams. These beams may be referred to herein as the second set of beams 123. These may be understood as one or more beams in the neighborhood of the wireless device 130, but not yet serving the wireless device 130, that the wireless device 130 is likely to detect in its future path, given its predicted mobility, which may be based on the generated log sent to the first network node 111. For the wireless device 130 to be able to measure the specific downlink signals in the candidate target beams, it may first need to be configured with information about the signals, such as the location in time and frequency, or the coding, or value, e.g., an identifier.

According to the foregoing, in this Action 606, the wireless device 130 may receive, from the first network node 111, an indication indicating at least one of: a set of reference signals and the second set of beams 123, the wireless device 130 is to at least one of: a) provide a report on to the first network node 111 and b) evaluate for beam selection when not being connected to the wireless network 100. The indication, which may be understood herein as a second indication, may be based on the sent log. The receiving in this Action 606 may be performed, e.g., via the first link 141.

As an overview of the foregoing, embodiments herein may be understood to relate to logging radio data in the wireless device 130 over the period of time covering both periods where the wireless device 130 has been connected to the network, and periods when it has not been connected to the network, and then reporting this log to the network.

An advantage of embodiments herein is that the logged information, reported by the wireless device 130 to the network may then be used by the network to predict the best candidate beams, that is, the second set of beams 123, and to initiate measurements on these, thereby enabling a quick and robust change of beams to the best targets, which in turn enables to maximize the bitrate, minimize latency and minimize the risk for a dropped connection.

Figure 7:
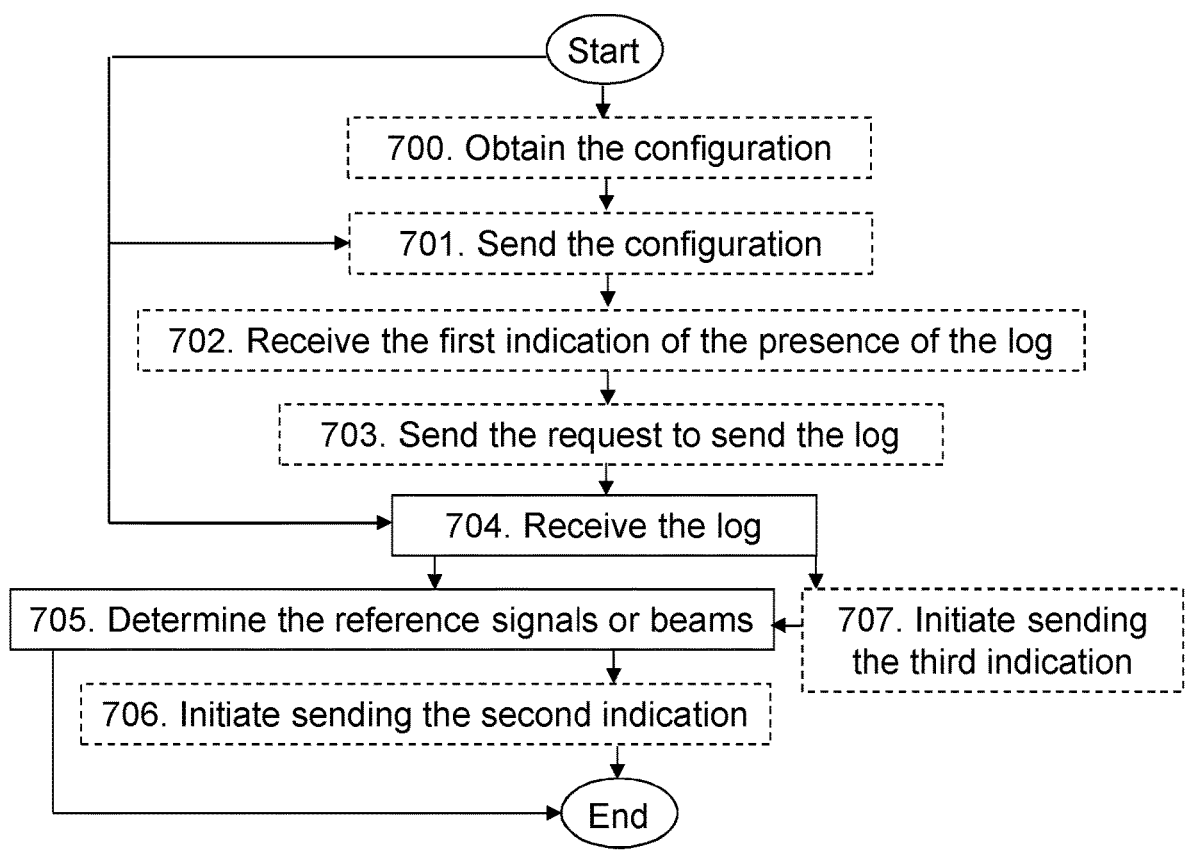
FIG. 7 is a flowchart depicting a method in a first network node, according to embodiments herein.

Embodiments of a method performed by the first network node 111 operating in the wireless communications network 100 wherein the plurality of beams 121 is transmitted by the one or more radio network nodes 111, 113, 114 operating in the wireless communications network 100, will now be described with reference to the flowchart depicted in FIG. 7.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 7, optional actions are indicated with dashed boxes.

The detailed description of some of the following corresponds to the same references provided above, in relation to the actions described for the wireless device 130, and will thus not be repeated here to simplify the description. For example, the connected state may be an RRC_CONNECTED state and to lack a connection may be understood as not being in the connected state, e.g., being in RRC_INACTIVE state, RRC_IDLE state, or in dormant state.

Action 700

In some embodiments, the first network node 111 in this Action 700, may obtain the configuration, from e.g., the second network node 112 such as an OaM system, another node such as or any of the other one or more network nodes, 113, 114, or an internal function. The configuration may specify the log to be compiled by the wireless device 130 with at least one of: a) the type of information to be added to the log, b) the amount of information to be added to the log, c) the time when the information is to be added to the log, d) the first condition to be met for the information to be added to the log, e) the periodicity with which the information is to be added to the log, and f) the second condition indicating when the added information is to be removed from the log.

Obtaining may be understood as e.g., receiving, e.g., via the second link 142, or another link.

Action 701

In some embodiments, the first network node 111 in this Action 701, may send, to the wireless device 130, the configuration. The configuration configures the wireless device 130 with at least one of: a) the type of information to be added to the log, b) the amount of information to be added to the log, c) the time when the information is to be added to the log, d) the first condition to be met for the information to be added to the log, e) the periodicity with which the information is to be added to the log, and f) the second condition indicating when the added information is to be removed from the log.

The sending in this Action 701 may be performed, e.g., via the first link 141.

What information to gather in the log may in turn be specified to the RAN, e.g., the first network node 111, by an OaM system, by another node, e.g., the second network node 112, or by an internal function in the first network node 111.

As described earlier, the information may be the first information, and the type of information of the first information may comprise one or more indicators of at least one of: a) the identifier for each of the beams in the first set of beams 122, b) the cell identifier associated with each of the beams in the first set of beams 122, c) the identifier of the one or more radio network nodes 111, 113, 114 transmitting each of the beams in the first set of beams 122, d) the strength of a signal in a beam, e) the quality of the signal in a beam, f) the timing advance used when transmitting in uplink, and g) the interference level.

Action 702

In some embodiments, the first network node 111, in this Action 702 may receive, from the wireless device 130, the first indication indicating the presence of the log. The receiving in this Action 702 may be performed, e.g., via the first link 141.

Action 703

Once the first network node 111 may have received the first indication, the first network node 111 may thereafter request the log. Accordingly, in this Action 703, the first network node 111 may send, to wireless device 130, the request to send the log. The sending in this Action 703 may be performed, e.g., via the first link 141.

Action 704

In this Action 704, the first network node 111 receives, from at least one wireless device operating in the wireless communications network 100, that is, from at least the wireless device 130, the log generated over the period of time. As described before, the log comprises the information about the first set of beams 122 detected by the wireless device 130, the first set of beams 122 being comprised in the plurality of beams 121. In addition, the log comprises the time of detection, by the wireless device 130, of the first set of beams 122. The log comprises the information and the time of detection for both of: i) the first set of time periods when the wireless device 130 was in the connected state in the wireless communications network 100, the first set of time periods being comprised in the period of time, and ii) the second set of time periods when the wireless device 130 lacked a connection in the wireless communications network 100, the second set of time periods being comprised in the period of time. The receiving in this Action 704 may be performed, e.g., via the first link 141.

In some embodiments, the receiving in this Action 704 may comprise receiving a respective log for each wireless device in a plurality of wireless devices that may be operating in the wireless communications network 100. The plurality of wireless devices may comprise the wireless device 130 and at least another wireless device operating in the wireless communications network 100.

As described earlier, the information may be the first information, and the log may further comprise second information regarding, in the period of time, at least one of: a) the speed of the wireless device 130, b) the type of reference signals detected by the wireless device 130, and c) the number of reference signals of a certain type detected by the wireless device 130.

Action 705

With the knowledge gathered from the log received from at least the wireless device 130, the first network node 111 may predict the path that the wireless device 130, may follow in the future, that is, in FIG. 5, for example, the dotted bold line. The first network node 111 may be able to predict the path followed by another wireless device or wireless devices operating in the wireless communications network 100. This may be the case, for example, if there are determined paths in the area where the wireless devices are moving, for example, roads.

Accordingly, the first network node 111, in this Action 705, determines, based on the received log, at least one of: the set of reference signals and the second set of beams 123, the wireless device 130, or the another wireless device operating in the wireless communications network 100, is predicted to detect in a future time period, and is to at least one of: a) provide a report on to the first network node 111 and b) evaluate for beam selection when not being connected to the wireless communications network 100. The determining in this Action 705 may be performed through for example machine learning methods, where data from several logs may be gathered together with data on further movements by the wireless device 130, and other wireless devices, to create a model that may be used to predict coming movements by wireless devices based upon the data in their reported logs.

The set of reference signals, may be UE-specific Reference signals such as CSI-RSs.

In some embodiments, wherein the receiving 704 comprises receiving the respective log for each wireless device in the plurality of wireless devices operating in the wireless communications network 100, the determining in this Action 705 may be further based on the respective log received from each wireless device in the plurality of wireless devices. The actions triggered in the first network node 111 based on the log or logs received, as explained above, may be the activation of the UE-specific Reference signals based on measurement reports of SS blocks, and based on the history of reports matching the previously known history of logged results performed in inactive/idle and reported to the first network node 111.

In NR, SS blocks may be transmitted periodically from the one or more radio network nodes 111, 113, 114 and used by the wireless devices to synchronize the receiver to the downlink signal, to estimate the downlink signal strength and quality, and to identify the cell and beam that provides the blocks. The SS blocks may be read by the wireless devices when they are RRC connected, inactive or idle. The CSI-RS, in NR, may be, but is not always, transmitted from the one or more radio network nodes 111, 113, 114. When transmitted, it may be used by the wireless devices, such as the wireless device 130, to better estimate the strength and quality of the radio signal. The CSI-RS may normally be read by the wireless devices only in RRC connected mode.

Action 706

Once the first network node 111 may have performed the determination of Action 705, the first network node 111 may, in this Action 706, initiate sending, to the wireless device 130 or to the or another wireless device, an indication indicating the determined at least one of: the set of reference signals and the second set of beams 123. The indication, that is, the second indication, may be based on the received log, or on the received logs from the plurality of wireless devices.

Initiating sending may be understood as triggering or starting sending itself or enabling, or instructing another node to send. The sending may then be performed, e.g., via the first link 141.

Action 707

In some embodiments, the first network node 111 may, in this Action 707, initiate sending, to another network node 112, 113, 114 comprised in the wireless communications network 100, another indication, the another indication indicating the received log in Action 704. The another indication may be considered a third indication.

Initiating sending may be understood as triggering or starting sending itself or enabling, or instructing another node to send.

This Action 707 may then enable the another network node 112, 113, 114 to configure another wireless device at a future time point, with a relevant set of beams for e.g., RRM measurements.

Figure 8:
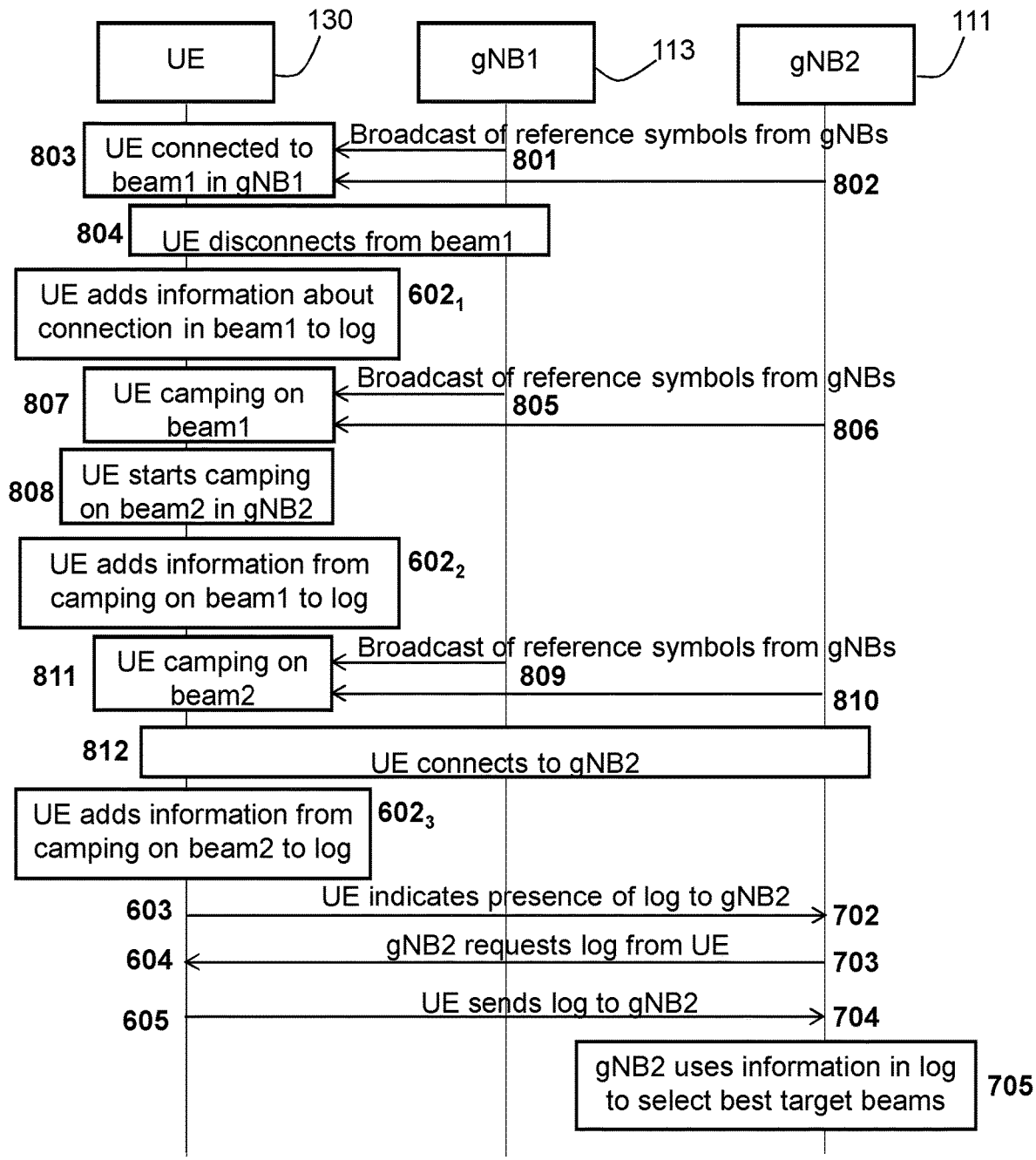
FIG. 8 is a schematic diagram illustrating an example of methods in a wireless device and a first network node of creating a log and reporting it to the network after connection setup, according to embodiments herein.

FIG. 8 is a schematic flowchart of a non-limiting example of embodiments herein. I this particular example, one of the one or more radio network nodes 113, 114, the third network node 113 in this case, is a first gNB (gNB1), the first network node 111 is a second gNB (gNB2), and the wireless device 130 is a UE. According to Action 801 and Action 802, the third network node 113 and the first network node 111, respectively, broadcast reference symbols. In Action 803, the wireless device 130 is connected to a first beam (beam1) transmitted by the third network node 113, and in Action 804, the wireless device 130 disconnects from the first beam. The first beam is comprised in the first set of beams 122. According to Action 602, the wireless device 130, in Action $602_1$, adds information about the connection in the first beam to the log it generates. In Action 805 and Action 806, the third network node 113 and the first network node 111, respectively, continue to broadcast reference symbols. In Action 807, the wireless device 130 lacks a connection to the first beam, but it is camping on it. In Action 808, the wireless device 130, which is moving, starts camping on a second beam transmitted by the first network node 111. The second beam is also comprised in the first set of beams 122. According to Action 602, the wireless device 130, in Action $602_2$, adds information collected on the first beam to the log while camping in the first beam, after starting to camp on the second beam. In Action 809 and Action 810, the third network node 113 and the first network node 111, respectively, continue to broadcast reference symbols. In Action 811, the wireless device 130 lacks a connection to the second beam, but it is camping on it. In Action 812, the wireless device 130 connects to the first network node 111. According to Action 602, the wireless device 130, in Action $602_3$, adds information collected on the second beam to the log while camping in the second beam. As described in Action 603, the wireless device 130 then sends the first indication indicating the presence of the log to the first network node 111, which is received by the first network node 111 in Action 702. In Action 703, the first network node 111 sends the request to send the log to the wireless device 130, which is received by the wireless device 130 in Action 604. As described in Action 604, the wireless device 130 then sends the generated log to the first network node 111, which is received by the first network node 111 in Action 704. In Action 705, the first network node 111 uses the information in the received log to determine the set of reference signals and the second set of beams 123.

Figure 9:
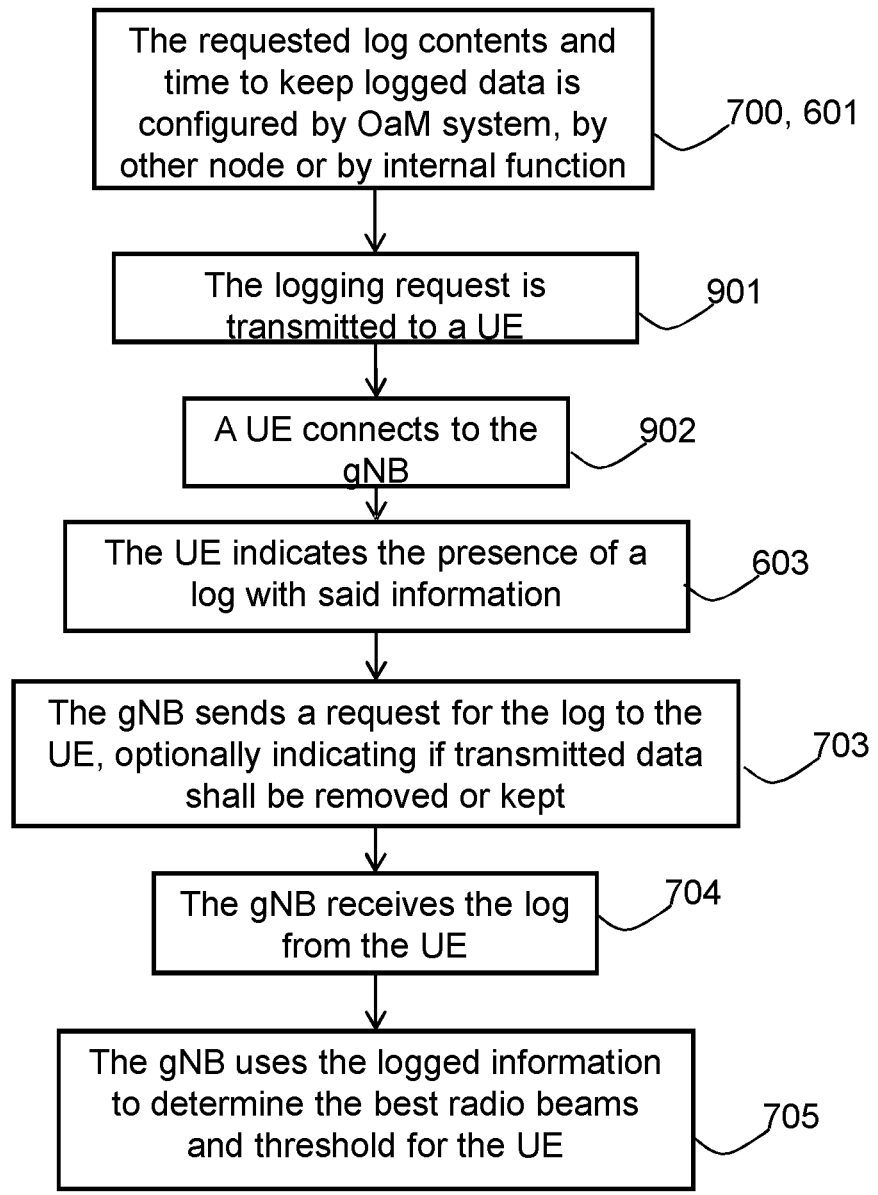
FIG. 9 is a schematic diagram illustrating an example of some actions of a method as performed by a gNB, according to embodiments herein.

FIG. 9 is a schematic flowchart of another non-limiting example of embodiments herein. In a first action, the first network node 111, which in this example is a gNB, receives the configuration, indicating the requested log contents and time to keep logged data, from the OaM system, another node or an internal function, as described in Action 700. In Action 901, the wireless device 130 receives a logging request from the first network node 111, to initiate the logging, according to the received configuration. In Action 902, the wireless device 130 connects to the first network node 111, which in this example is a gNB. According to Action 603, the wireless device 130 then sends the first indication indicating the presence of the log to the first network node 111. In Action 703, the first network node 111 sends the request to send the log to the wireless device 130, and optionally indicates if the transmitted data are to be removed or kept in the log. As described in Action 704, the first network node 111 receives the generated log from the wireless device 130. The first network node 111 then uses the logged information in the received log to determine, according to Action 705, the set of reference signals and the second set of beams 123. Additionally, the first network node 111 may, based on the received log, determine a threshold for the wireless device 130 to, for example, apply to a measured quantity, or the difference between measured quantities, such as RSRP, RSRQ and SINR, the threshold applied before taking an action as e.g., sending a report to the first network node 111 or performing a cell change when not connected to the network.

Figure 10:
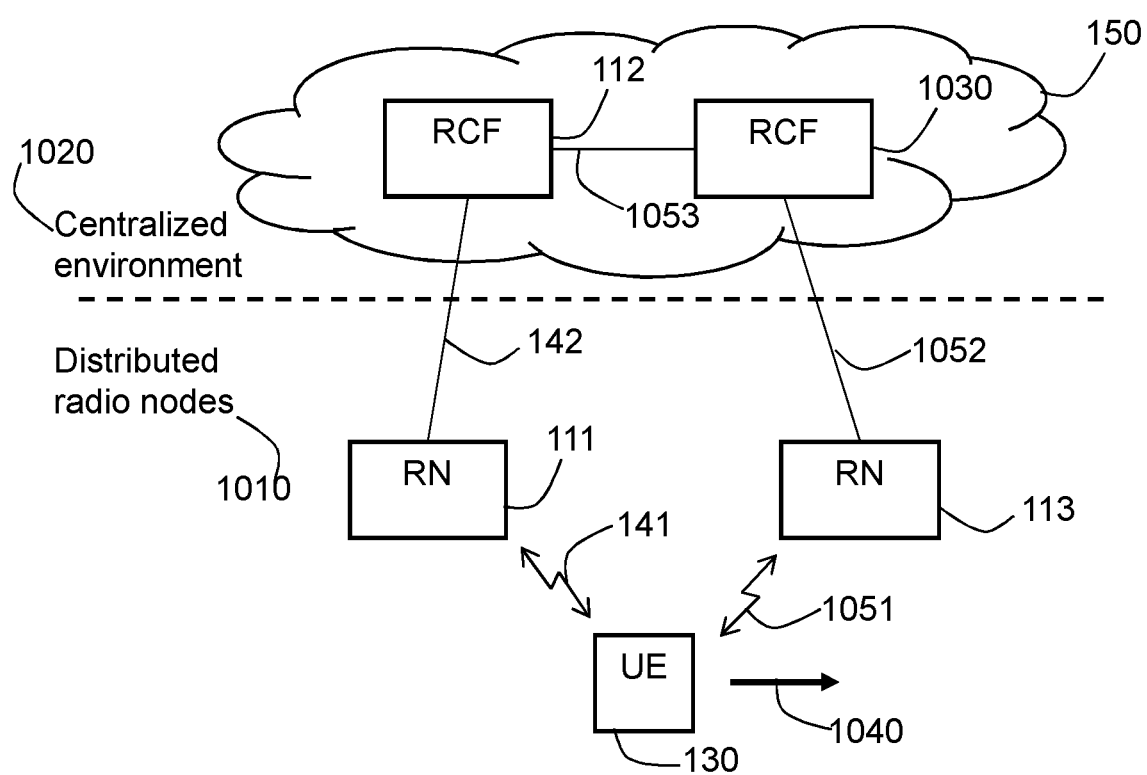
FIG. 10 is a schematic diagram illustrating a non-limiting example of radio control functions in a centralized computing environment, according to embodiments herein.

FIG. 10 is a schematic diagram illustrating a particular non-limiting example of the wireless communications network 100, according to embodiments herein. The RAN may be implemented as an NG-RAN typically located in the radio control function (RCF) in the one or more radio network nodes 111, 113, 114, each of which may be a gNB or ng-eNB. The RCF may be located physically in a distributed entity close to the radio nodes (RNs) or in a data center in a central location or on suitable hardware somewhere in between. This aspect of such a particular example is depicted, in a simplified manner, in FIG. 10, where both of the first network node 111 and the third network node 113 are distributed radio nodes 1010. Each is connected to a respective RCF in a centralized environment 1020 in the cloud 150. The second network node 112 is the respective RCF of the first network node 111. Another RCF 1030 is the respective RCF of the third network node 113. The direction of the movement in FIG. 5b is also depicted with a bold straight arrow 1040. The wireless device 130 may be configured to communicate within the wireless communications network 100 with the third network node 113 over a third link 1051, e.g., a radio link. The third network node 113 may be configured to communicate within the wireless communications network 100 with the another RCF 1030 over a fourth link 1052, e.g., a radio link, or a wired link. The second network node 112 may be configured to communicate within the wireless communications network 100 with the another RCF 1030 over a fifth link 1053, e.g., a radio link, or a wired link.

Figure 11:
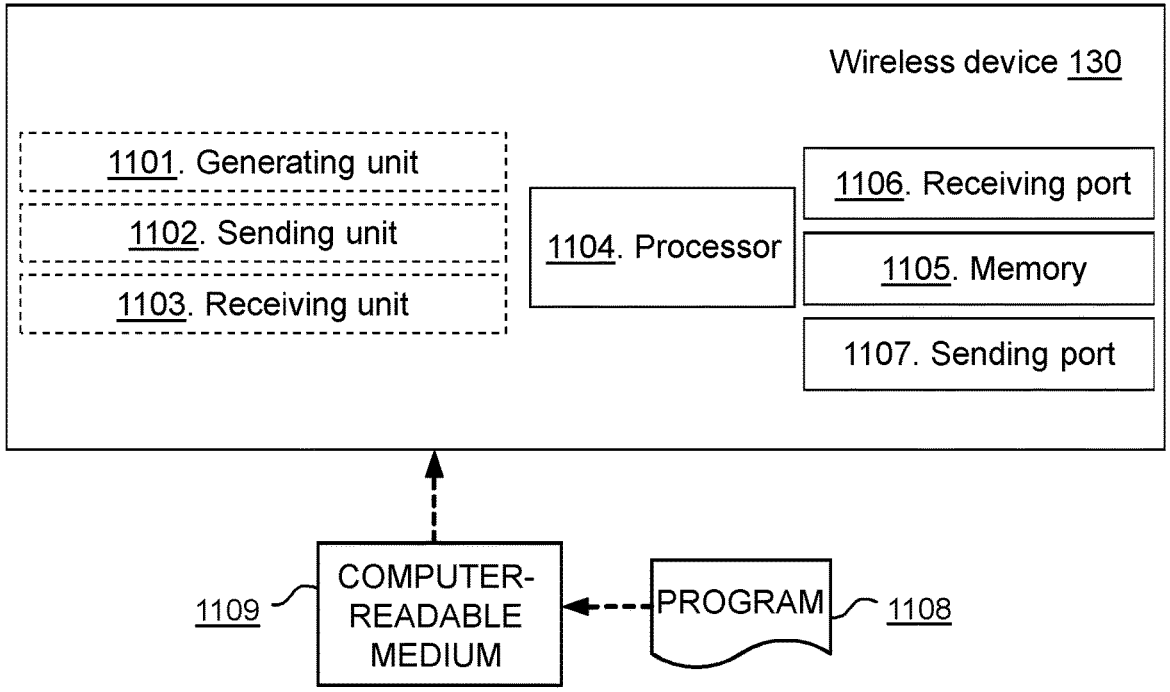
FIG. 11 is a schematic block diagram illustrating two non-limiting examples, a) and b), of a wireless device, according to embodiments herein.
Figure 11:
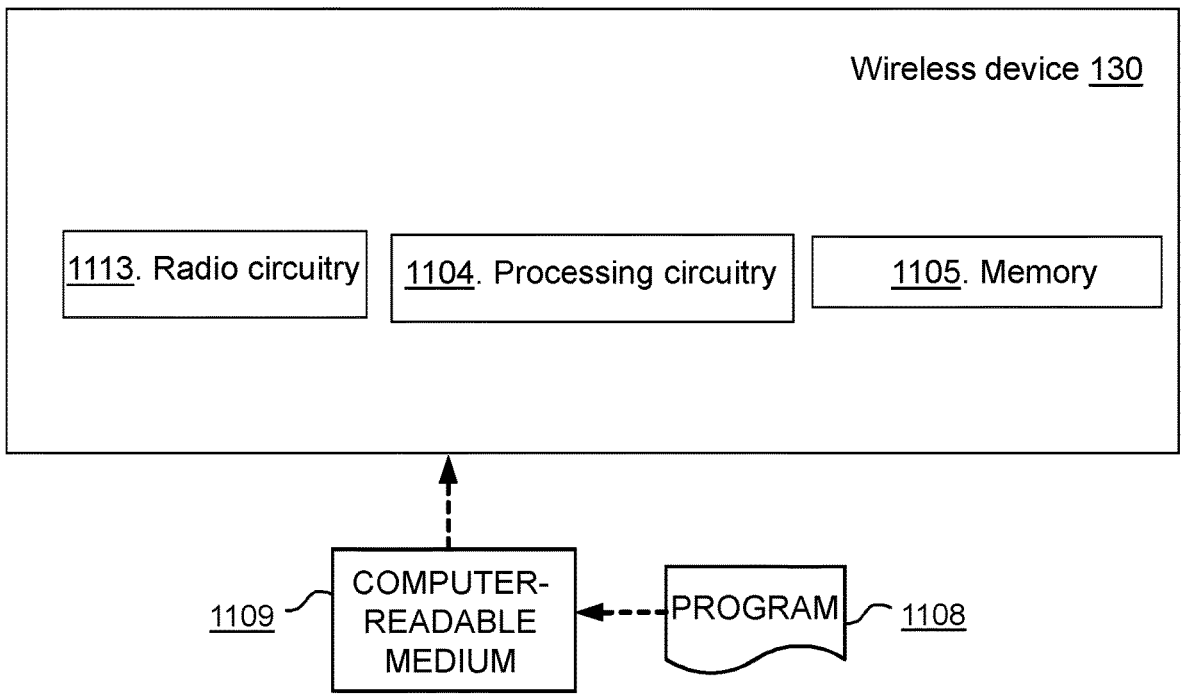

To perform the method actions described above in relation to FIG. 6 and FIGS. 8-9, the wireless device 130 may comprise the following arrangement depicted in FIG. 11. The wireless device 130 is configured to operate in the wireless communications network 100. The plurality of beams 121 is configured to be transmitted by the one or more network nodes 111, 113, 114 configured to operate in the wireless communications network 100.

The detailed description of some of the following corresponds to the same references provided above, in relation to the actions described for the wireless device 130, and will thus not be repeated here. For example, the connected state may be an RRC_CONNECTED state and to lack a connection may be understood as not being in the connected state, e.g., being in RRC_INACTIVE state, RRC_IDLE state, or in dormant state.

The wireless device 130 is configured to, e.g. by means of a generating unit 1101 within the wireless device 130 configured to, generate the log over the period of time. The log is configured to comprise: a) the information about the first set of beams 122 in the plurality of beams 121 configured to be detected by the wireless device 130, and b) the time of detection, by the wireless device 130, of the first set of beams 122. The log is further configured to comprise the information and the time of detection for both of: i) the first set of time periods when the wireless device 130 was in the connected state in the wireless communications network 100, the first set of time periods being comprised in the period of time, and ii) the second set of time periods when the wireless device 130 lacked a connection in the wireless communications network 100, the second set of time periods being comprised in the period of time.

The wireless device 130 is also configured to, e.g. by means of a sending unit 1102 within the wireless device 130 configured to, send the generated log to the first network node 111 configured to operate in the wireless communications network 100.

In some embodiments, the wireless device 130 may be further configured to, e.g. by means of a receiving unit 1103 within the wireless device 130 configured to, receive, from the first network node 111, the indication configured to indicate at least one of: the set of reference signals and the second set of beams 123, the wireless device 130 is to at least one of: a) provide the report on to the first network node 111 and b) evaluate for beam selection when not being connected to the wireless network 100. The indication is configured to be based on the log configured to be sent.

In some embodiments, the wireless device 130 may be further configured to, e.g. by means of the receiving unit 1103 within the wireless device 130 further configured to, receive, from the first network node 111 or from the second network node 112 configured to operate in the wireless communications network 100, the configuration. The configuration may be configured to configure the wireless device 130 with at least one of: a) the type of information to be added to the log, b) the amount of information to be added to the log, c) the time when the information is to be added to the log, d) the first condition to be met for the information to be added to the log, e) the periodicity with which the information is to be added to the log, and f) the second condition configured to indicate when the added information is to be removed from the log.

In some embodiments, the wireless device 130 may be further configured to, e.g. by means of the sending unit 1102 within the wireless device 130 further configured to, send, to the first network node 111 or any of the one or more network nodes 113, 114, the first indication being configured to indicate the presence of the log.

In some embodiments, the wireless device 130 may be further configured to, e.g. by means of the receiving unit 1103 within the wireless device 130 further configured to, receive, from the first network node 111, the request to send the log.

In some embodiments, the information may be the first information, and the type of information of the first information, may be configured to comprise one or more indicators of at least one of: a) the identifier for each of the beams in the first set of beams 122, b) the cell identifier associated with each of the beams in the first set of beams 122, c) the identifier of the one or more network nodes 111, 113, 114 configured to transmit each of the beams in the first set of beams 122, d) the strength of a signal in a beam, e) the quality of a signal in a beam, f) the timing advance used when transmitting in uplink, and g) the interference level.

In some embodiments, the information may be the first information, and the log may be further configured to comprise the second information regarding, in the period of time, at least one of: a) the speed of the wireless device 130, b) the type of reference signals configured to be detected by the wireless device 130, and c) the number of reference signals of the certain type configured to be detected by the wireless device 130.

The embodiments herein may be implemented through one or more processors, such as a processor 1104 in the wireless device 130 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1105 comprising one or more memory units. The memory 1105 is arranged to be used to store obtained information, store data, configurations, scheduling, and applications etc. to perform the methods herein when being executed in the wireless device 130.

In some embodiments, the wireless device 130 may receive information from, e.g., the first network node 111, the second network node 112, or any of the other one or more network nodes, 113, 114, through a receiving port 1106. In some examples, the receiving port 1106 may be, for example, connected to one or more antennas in wireless device 130. In other embodiments, the wireless device 130 may receive information from another structure in the wireless communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the wireless device 130 may be further configured to transmit or send information to e.g., the first network node 111, the second network node 112, or any of the other one or more network nodes, 113, 114, through a sending port 1107, which may be in communication with the processor 1104, and the memory 1105.

Those skilled in the art will also appreciate that the generating unit 1101, the sending unit 1102, and the receiving unit 1103 described above may refer to a combination of analog and digital circuits, and/or one or more processors configured with software and/or firmware, e.g., stored in memory, that, when executed by the one or more processors such as the processor 1104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the wireless device 130 may be respectively implemented by means of a computer program 1108 product, comprising instructions, i.e., software code portions, which, when executed on at least one processor 1104, cause the at least one processor 1104 to carry out the actions described herein, as performed by the wireless device 130. The computer program 1108 product may be stored on a computer-readable storage medium 1109. The computer-readable storage medium 1109, having stored thereon the computer program 1108, may comprise instructions which, when executed on at least one processor 1104, cause the at least one processor 1104 to carry out the actions described herein, as performed by the wireless device 130. In some embodiments, the computer-readable storage medium 1109 may be a non-transitory computer-readable storage medium, such as a CD ROM disc, a memory stick, or stored in the cloud space. In other embodiments, the computer program 1108 product may be stored on a carrier containing the computer program, wherein the carrier is one of an electronic signal, optical signal, radio signal, or the computer-readable storage medium 1109, as described above.

Hence, embodiments herein also relate to the wireless device 130 operative to operate in the wireless communications network 100. The wireless device 130 may comprise the processing circuitry 1104 and the memory 1105, said memory 1105 containing instructions executable by said processing circuitry 1104, whereby the wireless device 130 is further operative to perform the actions described herein in relation to the wireless device 130, e.g., in FIG. 6, FIGS. 8-9, and/or 14-18.

Any of the generating unit 1101, the sending unit 1102 and the receiving unit may be a processor of the wireless device 130, such as the processor 1104, or an application running on such processor.

Figure 12:
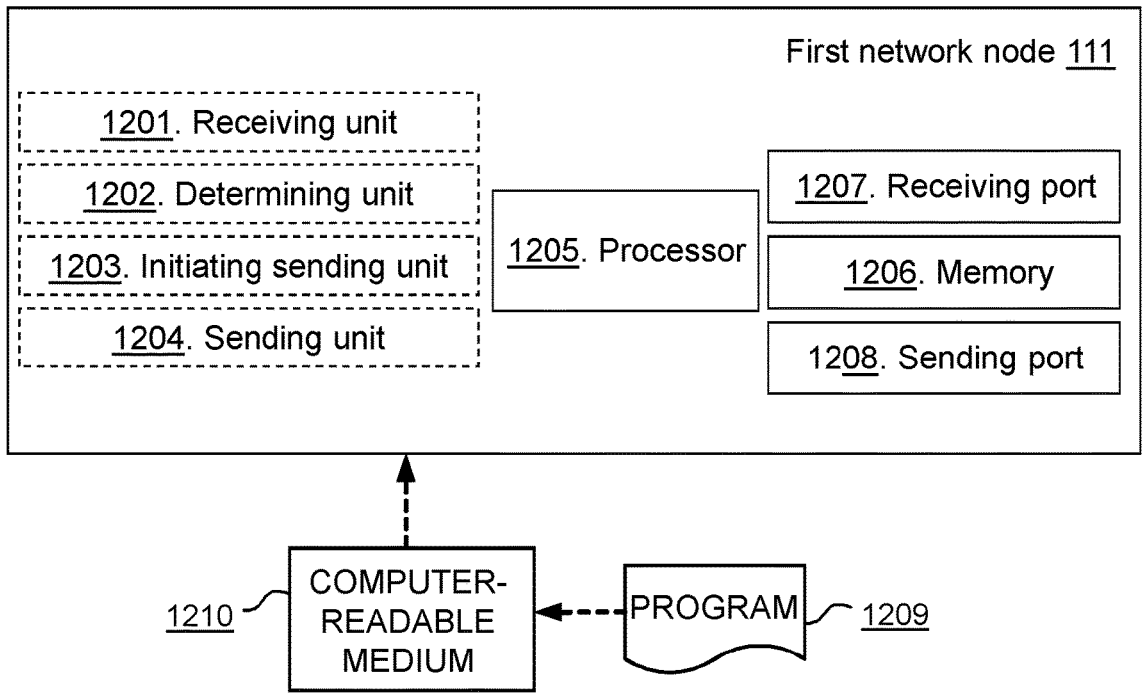
FIG. 12 is a schematic block diagram illustrating two non-limiting examples, a) and b), of a first network node, according to embodiments herein.
Figure 12:
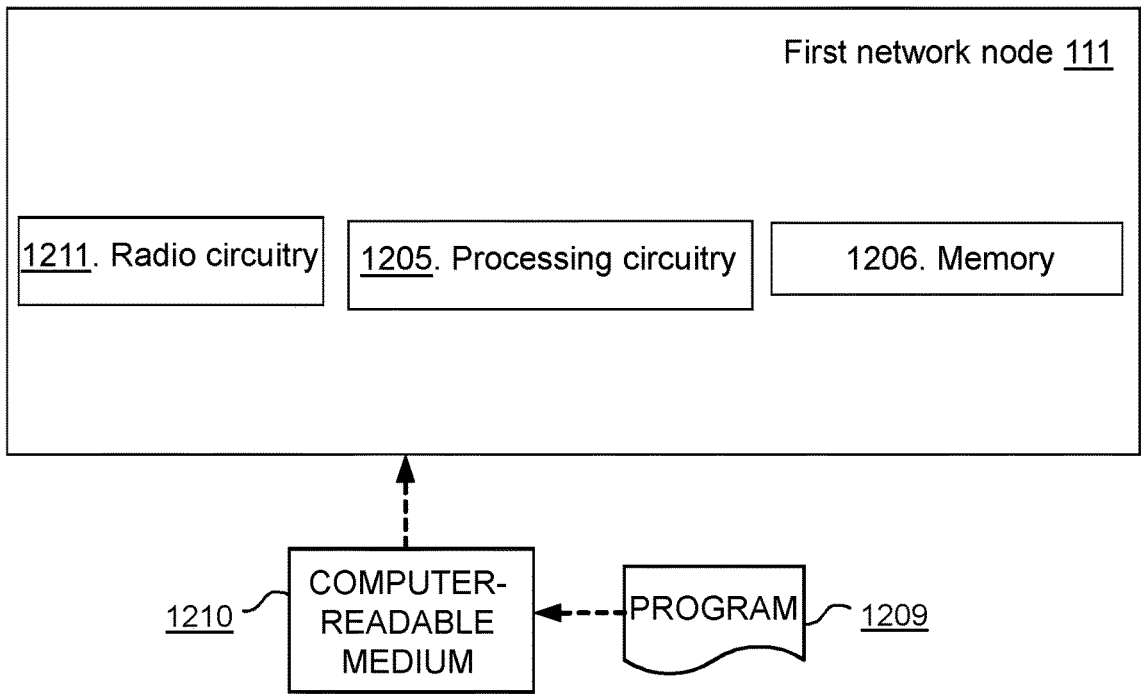

To perform the method actions described above in relation to FIG. 7, and FIGS. 8-9, the first network node 111 may comprise the following arrangement depicted in FIG. 12. The first network node 111 is configured to operate in the wireless communications network 100, wherein the plurality of beams 121 is configured to be transmitted by the one or more network nodes 111, 113, 114 configured to operate in the wireless communications network 100.

The detailed description of some of the following corresponds to the same references provided above, in relation to the actions described for the first network node 111, and will thus not be repeated here. For example, the connected state may be an RRC_CONNECTED state and to lack a connection may be understood as not being in the connected state, e.g., being in RRC_INACTIVE state, RRC_IDLE state, or in dormant state.

The first network node 111 is configured to, e.g. by means of a receiving unit 1201 within the first network node 111 configured to, receive, from the at least one wireless device 130 configured to operate in the wireless communications network 100, the log configured to be generated over the period of time. The log is configured to comprise: a) the information about a first set of beams 122 configured to be detected by the wireless device 130, the first set of beams 122 being configured to be comprised in the plurality of beams 121, and b) the time of detection, by the wireless device 130, of the first set of beams 122. The log is further configured to comprise the information and the time of detection for both of: i) the first set of time periods when the wireless device 130 was in the connected state in the wireless communications network 100, the first set of time periods being comprised in the period of time, and ii) the second set of time periods when the wireless device 130 lacked a connection in the wireless communications network 100, the second set of time periods being comprised in the period of time.

In some embodiments, the first network node 111 may be further configured to, e.g., by means of the receiving unit 1201 further configured to, may obtain the configuration, from e.g., the second network node 112 such as the OaM system, another node such as or any of the other one or more network nodes, 113, 114, or an internal function. The configuration may be configured to specify the log to be compiled by the wireless device 130 with at least one of: a) the type of information to be added to the log, b) the amount of information to be added to the log, c) the time when the information is to be added to the log, d) the first condition to be met for the information to be added to the log, e) the periodicity with which the information is to be added to the log, and f) the second condition indicating when the added information is to be removed from the log.

The first network node 111 is also configured to, e.g. by means of a determining unit 1202 within the first network node 111 configured to, determine, based on the log configured to be received, at least one of: the set of reference signals and the second set of beams 123, the wireless device 130 or another wireless device configured to operate in the wireless communications network 100 is configured to be predicted to detect in the future time period, and is to at least one of: a) provide the report on to the first network node 111 and b) evaluate for beam selection when not being connected to the wireless communications network 100.

In some embodiments, to receive may comprise to receive the respective log for each wireless device in the plurality of wireless devices operating in the wireless communications network 100, and to determine may be configured to be further based on the respective log configured to be received from each wireless device in the plurality of wireless devices.

In some embodiments, the first network node 111 may be configured to, e.g. by means of an initiating sending unit 1203 within the first network node 111 configured to, initiate sending, to the wireless device 130 or to the or another wireless device, the indication configured to indicate the least one of: the set of reference signals and the second set of beams 123 configured to be determined. The indication may be configured to be based on the log configured to be received.

In some embodiments, the first network node 111 may be further configured to, e.g. by means of the initiating sending unit 1203 further configured to, initiate sending, to another network node 112, 113, 114 comprised in the wireless communications network 100, another indication, the another indication being configured to indicate the log configured to be received.

In some embodiments, the first network node 111 may be configured to, e.g. by means of a sending unit 1204 within the first network node 111 configured to, send, to the wireless device 130, the configuration configured to configure the wireless device 130 with at least one of: a) the type of information to be added to the log, b) the amount of information to be added to the log, c) the time when the information is to be added to the log, d) the first condition to be met for the information to be added to the log, e) the periodicity with which the information is to be added to the log, and f) the second condition indicating when the added information is to be removed from the log.

The first network node 111 may be further configured to, e.g. by means of the receiving unit 1201 further configured to, receive, from the wireless device 130, the first indication configured to indicate the presence of the log.

In some embodiments, the first network node 111 may be further configured to, e.g. by means of the sending unit 1204 further configured to, send 703, to wireless device 130, the request to send the log.

In some embodiments, the information may be the first information, and the type of information of the first information may be configured to comprise the one or more indicators of at least one of: a) the identifier for each of the beams in the first set of beams 122, b) the cell identifier associated with each of the beams in the first set of beams 122, c) the identifier of the one or more network nodes 111, 113, 114 configured to transmit each of the beams in the first set of beams 122, d) the strength of a signal in a beam, e) the quality of a signal in a beam, f) the timing advance used when transmitting in uplink, and g) the interference level.

In some embodiments, the information may be the first information, and the log may be further configured to comprise the second information regarding, in the period of time, at least one of: a) the speed of the wireless device 130, b) the type of reference signals configured to be detected by the wireless device 130, and c) the number of reference signals of the certain type configured to be detected by the wireless device 130.

The embodiments herein may be implemented through one or more processors, such as a processor 1205 in the first network node 111 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1206 comprising one or more memory units. The memory 1206 is arranged to be used to store obtained information, store data, configurations, schedulings, and applications etc. to perform the methods herein when being executed in the first network node 111.

In some embodiments, the first network node 111 may receive information from, e.g., the wireless device 130 or any of the other wireless devices in the plurality of wireless devices, the second network node 112, a core network node, or any of the other one or more network nodes 113, 114, through a receiving port 1207. In some examples, the receiving port 1207 may be, for example, connected to one or more antennas in first network node 111. In other embodiments, the first network node 111 may receive information from another structure in the wireless communications network 100 through the receiving port 1207. Since the receiving port 1207 may be in communication with the processor 1205, the receiving port 1207 may then send the received information to the processor 1205. The receiving port 1207 may also be configured to receive other information.

The processor 1205 in the first network node 111 may be further configured to transmit or send information to e.g., the wireless device 130 or any of the other wireless devices in the plurality of wireless devices, the second network node 112, a core network node, or any of the other one or more network nodes 113, 114, through a sending port 1208, which may be in communication with the processor 1205, and the memory 1206.

Those skilled in the art will also appreciate that the receiving unit 1201, the determining unit 1202, the initiating sending unit 1203, and the sending unit 1204 described above may refer to a combination of analog and digital circuits, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first network node 111 may be respectively implemented by means of a computer program 1209 product, comprising instructions, i.e., software code portions, which, when executed on at least one processor 1205, cause the at least one processor 1205 to carry out the actions described herein, as performed by the first network node 111. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the first network node 111. In some embodiments, the computer-readable storage medium 1210 may be a non-transitory computer-readable storage medium, such as a CD ROM disc, a memory stick, or stored in the cloud space. In other embodiments, the computer program 1209 product may be stored on a carrier containing the computer program, wherein the carrier is one of an electronic signal, optical signal, radio signal, or the computer-readable storage medium 1210, as described above.

Hence, embodiments herein also relate to the first network node 111 operative to operate in the wireless communications network 100. The first network node 111 may comprise the processing circuitry 1205 and the memory 1206, said memory 1206 containing instructions executable by said processing circuitry 1205, whereby the first network node 111 is further operative to perform the actions described herein in relation to the first network node 111, e.g., in FIG. 7, FIGS. 8-9, and/or 14-18.

Any of the receiving unit 1201, the determining unit 1202, the initiating sending unit 1230 and the receiving unit 1204 may be a processor of the first network node 111, such as the processor 1205, or an application running on such processor.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Further Extensions and Variations

Figure 13:
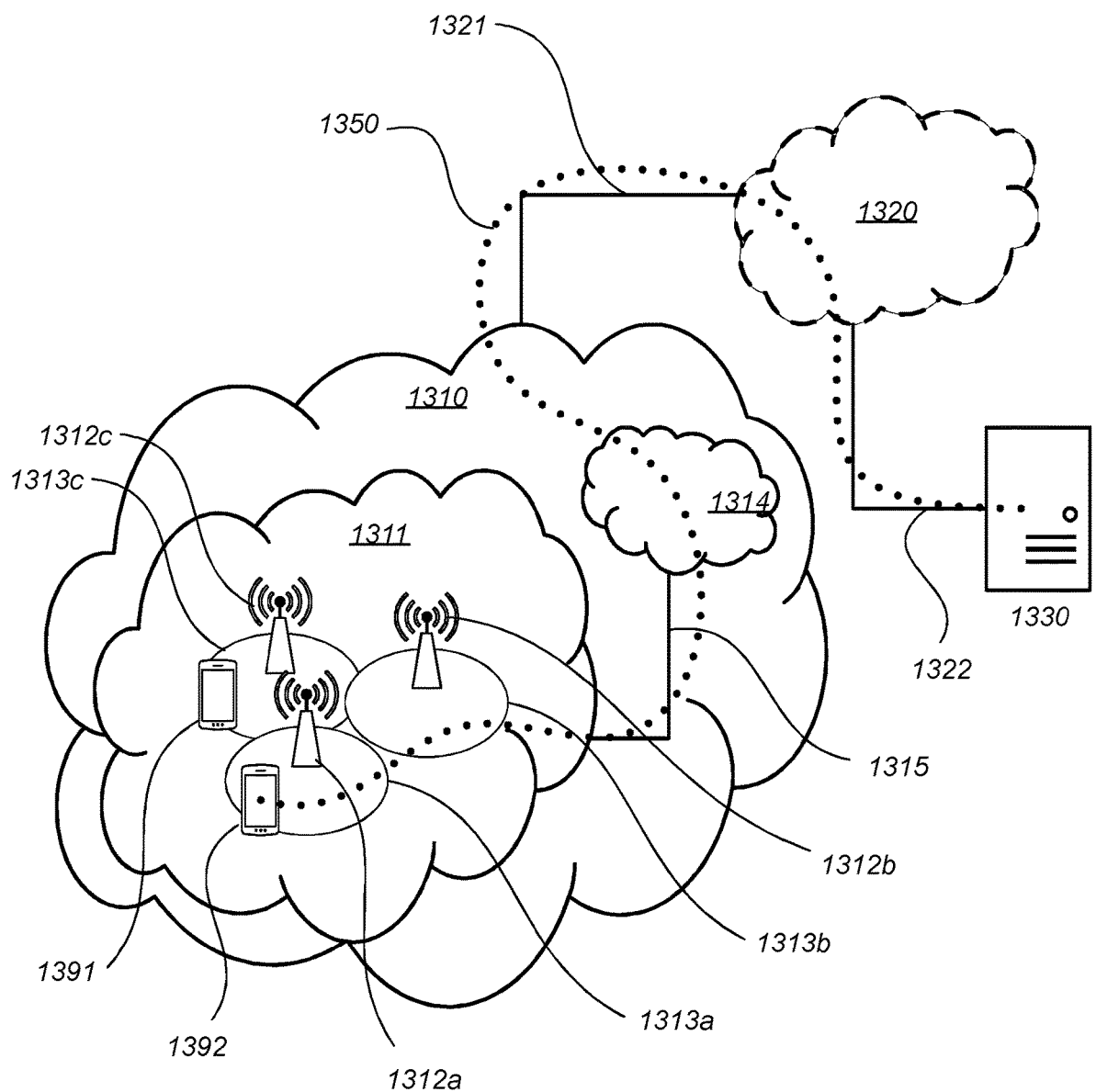
FIG. 13 is a schematic block diagram illustrating a telecommunication network connected via an intermediate network to a host computer, according to embodiments herein.

With reference to FIG. 13, in accordance with an embodiment, a communication system includes telecommunication network 1310 such as the wireless communications network 100, for example, a 3GPP-type cellular network, which comprises access network 1311, such as a radio access network, and core network 1314. Access network 1311 comprises a plurality of network nodes such as the first network node 111. For example, base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A plurality of wireless devices, such as the wireless device 130 are comprised in the wireless communications network 100. In FIG. 13, a first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 are examples of the wireless device 130.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 14, 15, 16, 17, and 18, which are described next, it may be understood that a UE is an example of the wireless device 130, and that any description provided for the UE equally applies to the wireless device 130. It may be also understood that the base station is an example of the first network node 111, and that any description provided for the base station equally applies to the first network node 111.

Figure 14:
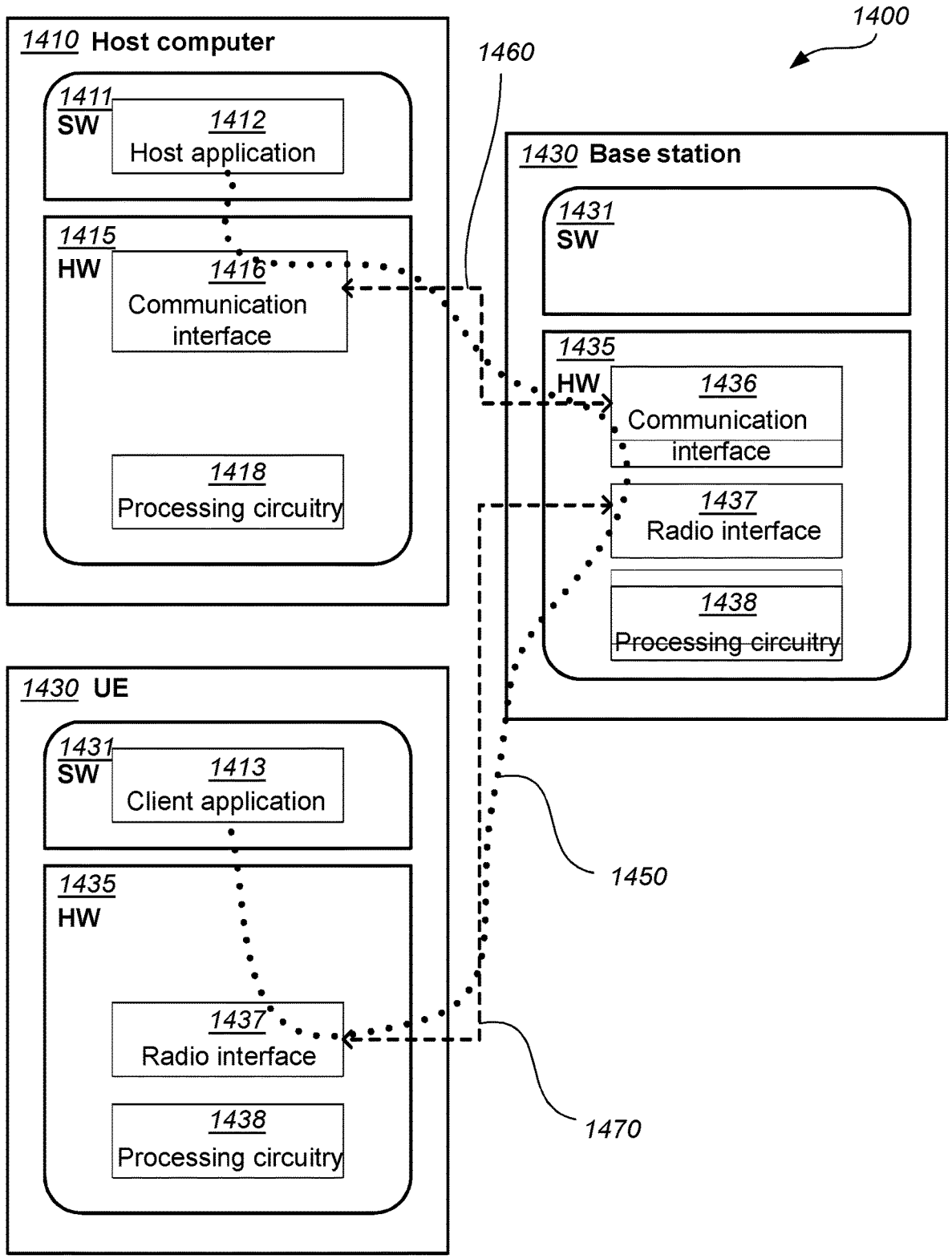
FIG. 14 is a generalized block diagram of a host computer communicating via a base station with a user equipment over a partially wireless connection, according to embodiments herein.

Example implementations, in accordance with an embodiment, of the wireless device 130, e.g., a UE, the first network node 111, e.g., a base station and host computer discussed in the preceding paragraphs will now be described with reference to FIG. 14. FIG. 14 is a schematic diagram illustrating a host computer communicating via a base station with a user equipment over a partially wireless connection in accordance with some embodiments. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes the first network node 111, exemplified in FIG. 14 as a base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with the wireless device 130, exemplified in FIG. 14 as a UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
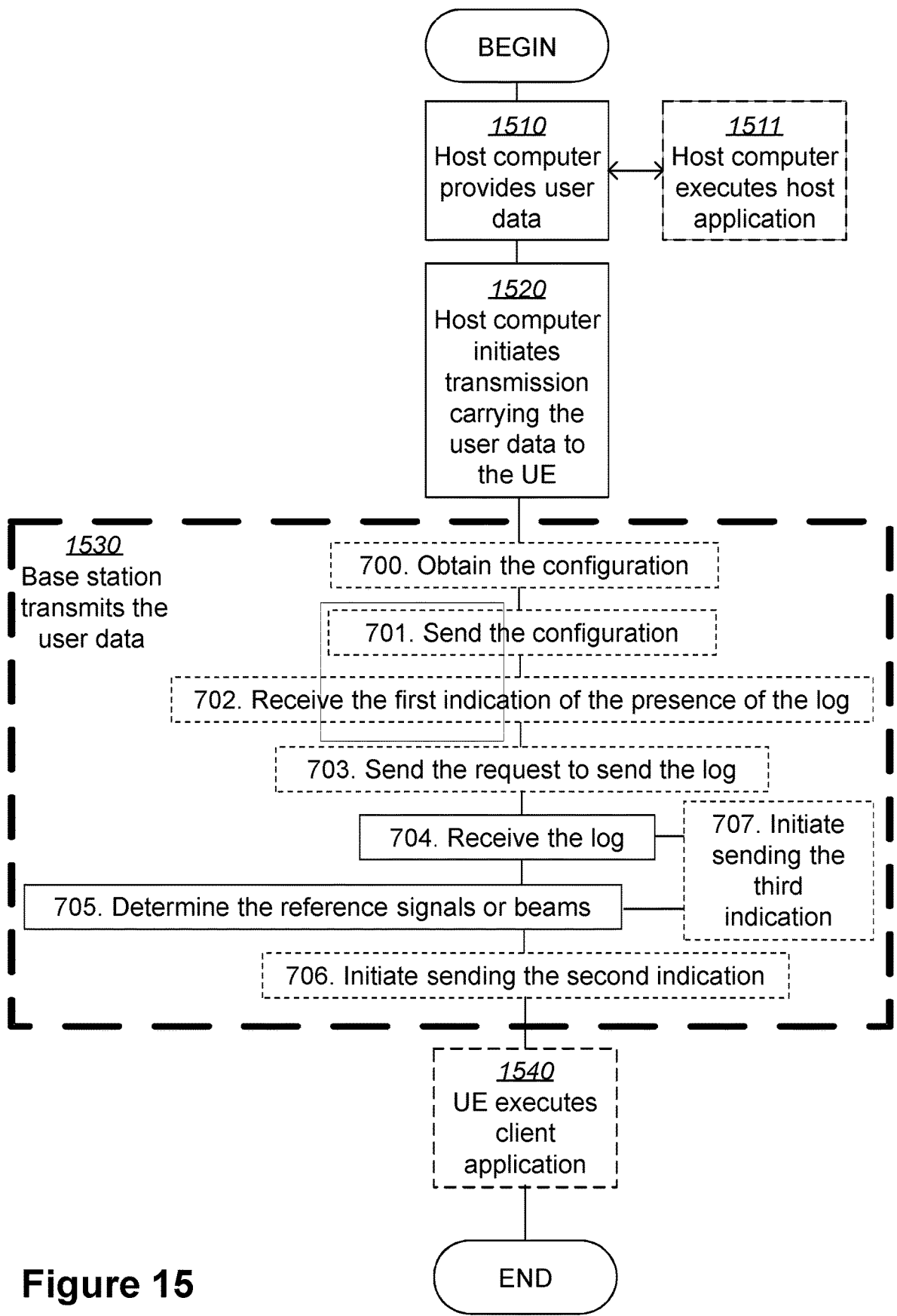
FIG. 15 is a flowchart depicting embodiments of a method in a communications system including a host computer, a base station and a user equipment, according to embodiments herein.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
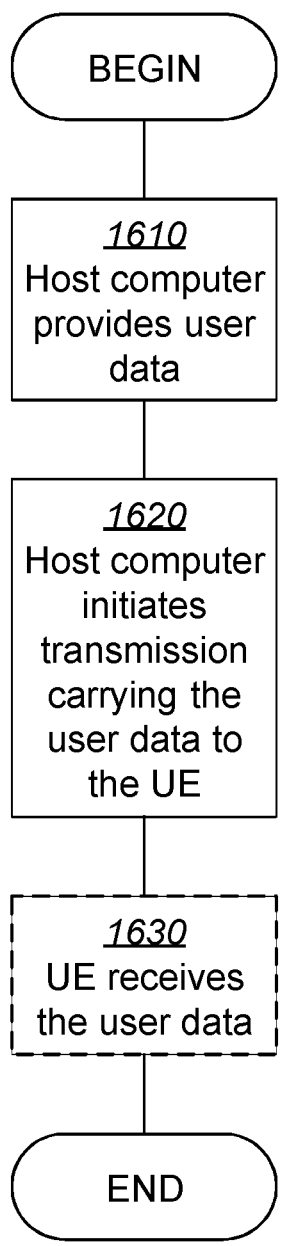
FIG. 16 is a flowchart depicting embodiments of a method in a communications system including a host computer, a base station and a user equipment, according to embodiments herein.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
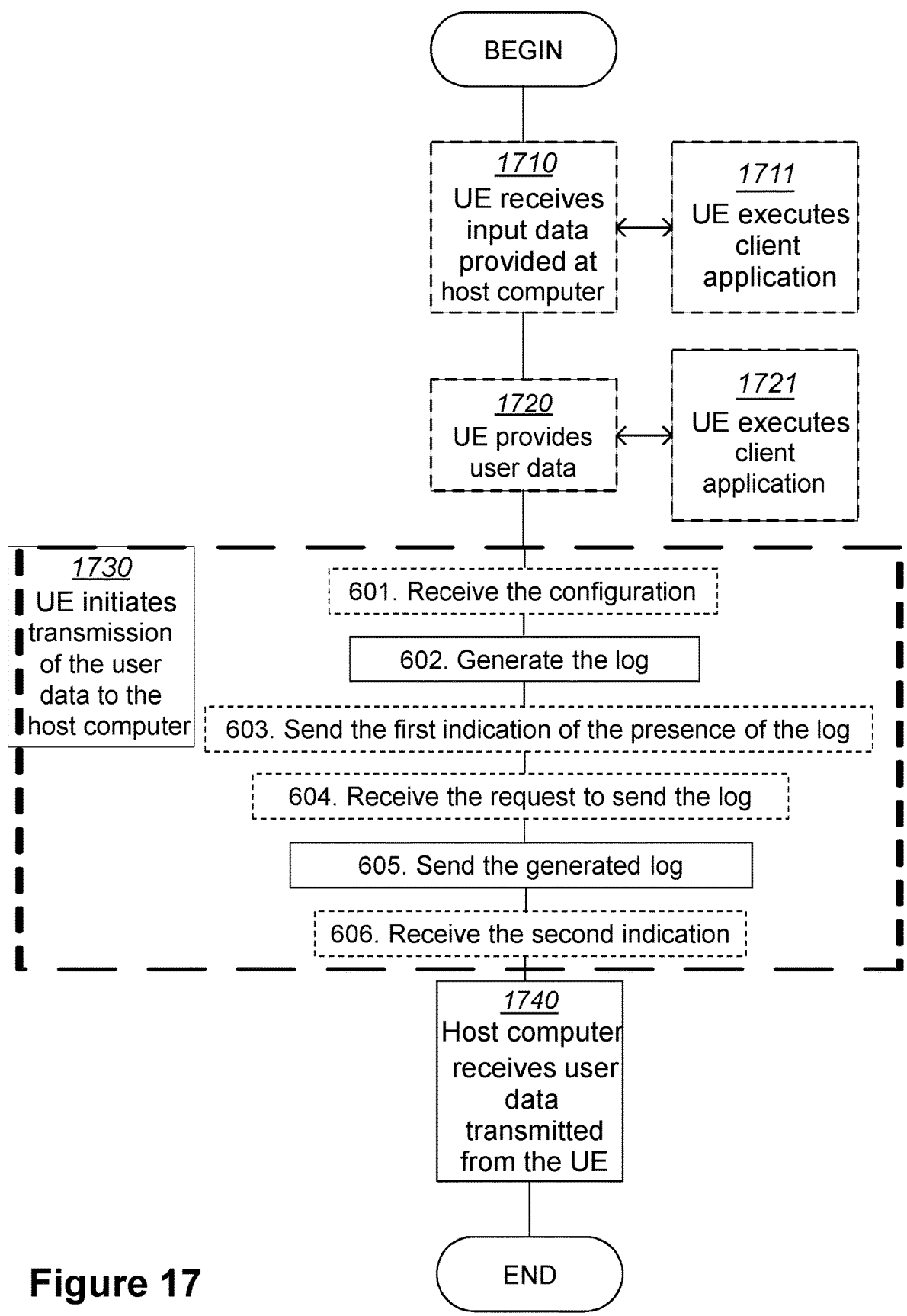
FIG. 17 is a flowchart depicting embodiments of a method in a communications system including a host computer, a base station and a user equipment, according to embodiments herein.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
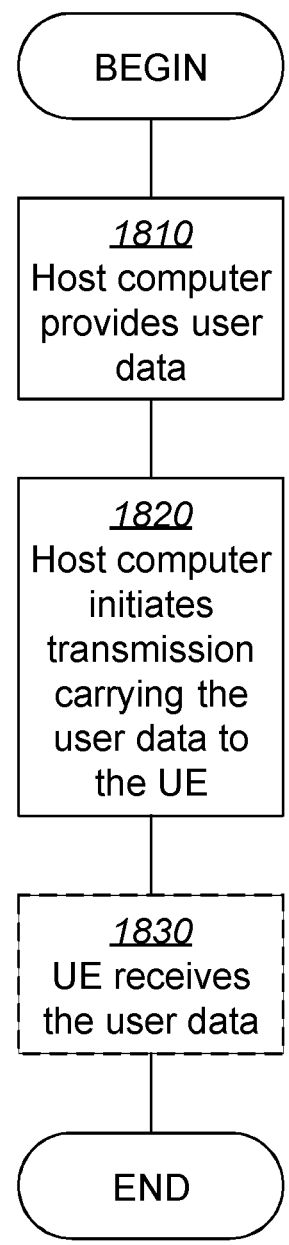
FIG. 18 is a flowchart depicting embodiments of a method in a communications system including a host computer, a base station and a user equipment, according to embodiments herein.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions 700-707 described herein as performed by the first network node 111.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions 700-707 described herein as performed by the first network node 111.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions 700-707 described herein as performed by the first network node 111.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions 700-707 described herein as performed by the first network node 111.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions 601-606 described herein as performed by the wireless device 130.

25. A communication system including a host computer comprising:
   processing circuitry configured to provide user data; and
   a communication interface configured to forward user data to a cellular network for transmission to a user equipment (UE), wherein the UE comprises a radio interface and processing circuitry, the UE's processing circuitry configured to perform one or more of the actions 601-606 described herein as performed by the wireless device 130.

26. The communication system of embodiment 25, further including the UE.
27. The communication system of embodiment 26, wherein the cellular network further includes a base station configured to communicate with the UE.
28. The communication system of embodiment 26 or 27, wherein:
the processing circuitry of the host computer is configured to execute a host application, thereby providing the user data; and
the UE's processing circuitry is configured to execute a client application associated with the host application.
31. A method implemented in a user equipment (UE), comprising one or more of the actions 601-606 described herein as performed by the wireless device 130.
35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions 601-606 described herein as performed by the wireless device 130.
36. The method of embodiment 35, further comprising:
at the UE, receiving the user data from the base station.
41. A user equipment (UE) configured to communicate with a base station, the UE comprising a radio interface and processing circuitry configured to perform one or more of the actions 601-606 described herein as performed by the wireless device 130.
45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions 601-606 described herein as performed by the wireless device 130.
46. The communication system of embodiment 45, further including the UE.
47. The communication system of embodiment 46, further including the base station, wherein the base station comprises a radio interface configured to communicate with the UE and a communication interface configured to forward to the host computer the user data carried by a transmission from the UE to the base station.
48. The communication system of embodiment 46 or 47, wherein:
the processing circuitry of the host computer is configured to execute a host application; and
the UE's processing circuitry is configured to execute a client application associated with the host application, thereby providing the user data.
49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.
51. A method implemented in a user equipment (UE), comprising one or more of the actions 601-606 described herein as performed by the wireless device 130.
52. The method of embodiment 51, further comprising:
providing user data; and
forwarding the user data to a host computer via the transmission to the base station.
55. A method implemented in a communication system including a host computer, a base station and a user equipment (UE), the method comprising:
at the host computer, receiving user data transmitted to the base station from the UE, wherein the UE performs one or more of the actions 601-606 described herein as performed by the wireless device 130.
56. The method of embodiment 55, further comprising:
at the UE, providing the user data to the base station.
57. The method of embodiment 56, further comprising:
at the UE, executing a client application, thereby providing the user data to be transmitted; and
at the host computer, executing a host application associated with the client application.
58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.
61. A base station configured to communicate with a user equipment (UE), the base station comprising a radio interface and processing circuitry configured to perform one or more of the actions 700-707 described herein as performed by the first network node 111.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions 700-707 described herein as performed by the first network node 111.
66. The communication system of embodiment 65, further including the base station.
67. The communication system of embodiment 66, further including the UE, wherein the UE is configured to communicate with the base station.
68. The communication system of embodiment 67, wherein:
the processing circuitry of the host computer is configured to execute a host application;
the UE is configured to execute a client application associated with the host application, thereby providing the user data to be received by the host computer.
71. A method implemented in a base station, comprising one or more of the actions 700-707 described herein as performed by the first network node 111.
75. A method implemented in a communication system including a host computer, a base station and a user equipment (UE), the method comprising:
at the host computer, receiving, from the base station, user data originating from a transmission which the base station has received from the UE, wherein the UE performs one or more of the actions 601-606 described herein as performed by the wireless device 130.
76. The method of embodiment 75, further comprising:
at the base station, receiving the user data from the UE.

77. The method of embodiment 76, further comprising:
at the base station, initiating a transmission of the received user data to the host computer.

The invention claimed is:

1. A method performed by a wireless device operating in a wireless communications network wherein a plurality of beams is transmitted by one or more network nodes operating in the wireless communications network, the method comprising:
generating a log over a period of time, the log comprising:
information about a first set of beams in the plurality of beams detected by the wireless device; and
a time of detection, by the wireless device, of the first set of beams;
wherein the log comprises the information and times of detection for both of:
a first set of time periods when the wireless device was in a connected state in the wireless communications network, the first set of time periods being comprised in the period of time; and
a second set of time periods when the wireless device lacked a connection in the wireless communications network, the second set of time periods being comprised in the period of time; and
sending the generated log to a first network node operating in the wireless communications network.

2. The method of claim 1, further comprising receiving, from the first network node, an indication indicating at least one of:
a set of reference signals; and
a second set of beams; and
wherein the wireless device is to at least one of:
provide a report to the first network node; and
evaluate the second set of beams for beam selection when not being connected to the wireless network; and
wherein the indication is based on the sent log.

3. The method of claim 1, further comprising receiving, from the first network node, or from a second network node operating in the wireless communications network, a configuration configuring the wireless device with at least one of:
a type of the information to be added to the log;
an amount of the information to be added to the log;
a time when the information is to be added to the log,
a first condition to be met for the information to be added to the log;
a periodicity with which the information is to be added to the log; and
a second condition indicating when the information added to the log is to be removed from the log.

4. The method of claim 1, further comprising sending, to the first network node or one or more other network nodes, a first indication indicating a presence of the log.

5. The method of claim 1, further comprising receiving, from the first network node, a request to send the log.

6. The method of claim 1:
wherein the information is a first information; and
wherein a type of information of the first information comprises one or more indicators of at least one of:
an identifier for each of the beams in the first set of beams;
a cell identifier associated with each of the beams in the first set of beams;
an identifier of the one or more network nodes transmitting each of the beams in the first set of beams;
a strength of a signal in a beam;
a quality of a signal in a beam;
a timing advance used when transmitting in uplink; and
an interference level.

7. The method of claim 1:
wherein the information is a first information; and
wherein the log further comprises second information regarding, in the period of time, at least one of:
a speed of the wireless device;
a type of reference signals detected by the wireless device; and
a number of reference signals of a certain type detected by the wireless device.

8. A non-transitory computer readable recording medium storing a computer program product for controlling a wireless device operating in a wireless communications network wherein a plurality of beams is transmitted by one or more network nodes operating in the wireless communications network, the computer program product comprising software instructions which, when run on processing circuitry of the wireless device, causes the wireless device to:
generate a log over a period of time, the log comprising:
information about a first set of beams in the plurality of beams detected by the wireless device; and
a time of detection, by the wireless device, of the first set of beams;
wherein the log comprises the information and times of detection for both of:
a first set of time periods when the wireless device was in a connected state in the wireless communications network, the first set of time periods being comprised in the period of time; and
a second set of time periods when the wireless device lacked a connection in the wireless communications network, the second set of time periods being comprised in the period of time; and
send the generated log to a first network node operating in the wireless communications network.

9. A method performed by a first network node operating in a wireless communications network wherein a plurality of beams is transmitted by one or more network nodes operating in the wireless communications network, the method comprising:
receiving, from at least one wireless device operating in the wireless communications network, a log generated over a period of time, the log comprising:
information about a first set of beams detected by the wireless device, the first set of beams being comprised in the plurality of beams; and
a time of detection, by the wireless device, of the first set of beams;
wherein the log comprises the information and times of detection for both of:
a first set of time periods when the wireless device was in a connected state in the wireless communications network, the first set of time periods being comprised in the period of time, and
a second set of time periods when the wireless device lacked a connection in the wireless communications network, the second set of time periods being comprised in the period of time, and
determining, based on the received log, at least one of:
a set of reference signals; and
a second set of beams, wherein the wireless device or another wireless device operating in the wireless communications network is predicted to detect in a future time period, and is to at least one of:

provide a report to the first network node; and
evaluate the second set of beams for beam selection when not being connected to the wireless communications network.

10. The method of claim 9:
wherein the receiving comprises receiving a respective log for each wireless device in a plurality of wireless devices operating in the wireless communications network; and
wherein the determining is further based on the respective log received from each wireless device in the plurality of wireless devices.

11. The method of claim 9 wherein the method further comprises initiating sending, to the wireless device or to the another wireless device, an indication indicating the determined at least one of:
the set of reference signals; and
the second set of beams; and
wherein the indication being based on the received log.

12. The method of claim 9, further comprising sending, to the wireless device, a configuration configuring the wireless device with at least one of:
a type of the information to be added to the log;
an amount of the information to be added to the log;
a time when the information is to be added to the log,
a first condition to be met for the information to be added to the log;
a periodicity with which the information is to be added to the log; and
a second condition indicating when the information added to the log is to be removed from the log.

13. The method of claim 9, further comprising receiving, from the wireless device, a first indication indicating a presence of the log.

14. The method of claim 9, further comprising sending, to wireless device, a request to send the log.

15. The method of claim 9:
wherein the information is a first information; and
wherein a type of information of the first information comprises one or more indicators of at least one of:
an identifier for each of the beams in the first set of beams;
a cell identifier associated with each of the beams in the first set of beams,
an identifier of the one or more network nodes transmitting each of the beams in the first set of beams,
a strength of a signal in a beam;
a quality of a signal in a beam;
a timing advance used when transmitting in uplink; and
an interference level.

16. The method of claim 9:
wherein the information is a first information; and
wherein the log further comprises second information regarding, in the period of time, at least one of:
a speed of the wireless device;
a type of reference signals detected by the wireless device; and
a number of reference signals of a certain type detected by the wireless device.

17. The method of claim 9, further comprising initiating sending, to another network node comprised in the wireless communications network, another indication, the another indication indicating the received log.

18. A non-transitory computer readable recording medium storing a computer program product for controlling a first network node operating in a wireless communications network wherein a plurality of beams is transmitted by one or more network nodes operating in the wireless communications network, the computer program product comprising software instructions which, when run on processing circuitry of the first network node, causes the first network node to:
receive, from at least one wireless device operating in the wireless communications network, a log generated over a period of time, the log comprising:
information about a first set of beams detected by the wireless device, the first set of beams being comprised in the plurality of beams; and
a time of detection, by the wireless device, of the first set of beams;
wherein the log comprises the information and times of detection for both of:
a first set of time periods when the wireless device was in a connected state in the wireless communications network, the first set of time periods being comprised in the period of time, and
a second set of time periods when the wireless device lacked a connection in the wireless communications network, the second set of time periods being comprised in the period of time, and
determine, based on the received log, at least one of: a set of reference signals and a second set of beams, the wireless device or another wireless device operating in the wireless communications network is predicted to detect in a future time period, and is to at least one of:
provide a report to the first network node; and
evaluate the second set of beams for beam selection when not being connected to the wireless communications network.

19. A wireless device configured to operate in a wireless communications network wherein a plurality of beams is configured to be transmitted by one or more network nodes configured to operate in the wireless communications network, the wireless comprising:
processing circuitry;
memory containing instructions executable by the processing circuitry whereby the wireless device is operative to:
generate a log over a period of time, the log being configured to comprise:
information about a first set of beams in the plurality of beams configured to be detected by the wireless device; and
a time of detection, by the wireless device, of the first set of beams,
wherein the comprises the information and times of detection for both of:
a first set of time periods when the wireless device was in a connected state in the wireless communications network, the first set of time periods being comprised in the period of time; and
a second set of time periods when the wireless device lacked a connection in the wireless communications network, the second set of time periods being comprised in the period of time; and
send the generated log to a first network node configured to operate in the wireless communications network.

20. The wireless device of claim 19, wherein the instructions are such that the wireless device is operative to receive, from the first network node, an indication configured to indicate at least one of: a set of reference signals and a second set of beams, the wireless device is to at least one of:

provide a report to the first network node; and
evaluate for beam selection when not being connected to the wireless network, the indication being configured to be based on the log configured to be sent.

21. The wireless device of claim 19, wherein the instructions are such that the wireless device is operative to receive, from the first network node or from a second network node configured to operate in the wireless communications network, a configuration being configured to configure the wireless device with at least one of:
a type of the information to be added to the log;
an amount of the information to be added to the log;
a time when the information is to be added to the log,
a first condition to be met for the information to be added to the log;
a periodicity with which the information is to be added to the log; and
a second condition configured to indicate when the information added to the log is to be removed from the log.

22. The wireless device of claim 19, wherein the instructions are such that the wireless device is operative to send, to the first network node or to one or more other network nodes, a first indication being configured to indicate a presence of the log.

23. The wireless device of claim 19, wherein the instructions are such that the wireless device is operative to receive, from the first network node, a request to send the log.

24. The wireless device of claim 19:
wherein the information is a first information; and
wherein a type of information of the first information, is configured to comprise one or more indicators of at least one of:
an identifier for each of the beams in the first set of beams;
a cell identifier associated with each of the beams in the first set of beams,
an identifier of the one or more network nodes configured to transmit each of the beams in the first set of beams,
a strength of a signal in a beam;
a quality of a signal in a beam;
a timing advance used when transmitting in uplink; and
an interference level.

25. The wireless device of claim 19:
wherein the information is a first information; and
wherein the log is further configured to comprise second information regarding, in the period of time, at least one of:
a speed of the wireless device;
a type of reference signals configured to be detected by the wireless device; and
a number of reference signals of a certain type configured to be detected by the wireless device.

26. A first network node configured to operate in a wireless communications network wherein a plurality of beams is configured to be transmitted by one or more network nodes configured to operate in the wireless communications network, the first network comprising:
processing circuitry;
memory containing instructions executable by the processing circuitry whereby the first network node is operative to:
receive, from at least one wireless device configured to operate in the wireless communications network, a log configured to be generated over a period of time, the log comprising:
information about a first set of beams configured to be detected by the wireless device, the first set of beams being configured to be comprised in the plurality of beams; and
a time of detection, by the wireless device, of the first set of beams;
wherein the log comprises the information and times of detection for both of:
a first set of time periods when the wireless device was in a connected state in the wireless communications network, the first set of time periods being comprised in the period of time, and
a second set of time periods when the wireless device lacked a connection in the wireless communications network, the second set of time periods being comprised in the period of time, and
determine, based on the log configured to be received, at least one of:
a set of reference signals; and
a second set of beams, wherein the wireless device or another wireless device configured to operate in the wireless communications network is configured to be predicted to detect in a future time period, and is to at least one of:
provide a report to the first network node; and
evaluate the second set of beams for beam selection when not being connected to the wireless communications network.

27. The first network node of claim 26, wherein the instructions are such that the first network node is operative to:
receive a respective log for each wireless device in a plurality of wireless devices operating in the wireless communications network; and
perform the determining further based on the respective log received from each wireless device in the plurality of wireless devices.

28. The first network node of claim 26, wherein the instructions are such that the first network node is operative to initiate sending, to the wireless device or to the another wireless device, an indication configured to indicate the at least one of:
the set of reference signals; and
the second set of beams configured to be determined; and
wherein the indication being configured to be based on the log configured to be received.

29. The first network node of claim 26, wherein the instructions are such that the first network node is operative to send, to the wireless device, a configuration configured to configure the wireless device with at least one of:
a type of the information to be added to the log;
an amount of the information to be added to the log;
a time when the information is to be added to the log,
a first condition to be met for the information to be added to the log;
a periodicity with which the information is to be added to the log; and
a second condition indicating when the information added to the log is to be removed from the log.

30. The first network node of claim 26, wherein the instructions are such that the first network node is operative to receive, from the wireless device, a first indication configured to indicate a presence of the log.

31. The first network node of claim 26, wherein the instructions are such that the first network node is operative to at least one of:

send, to wireless device, a request to send the log; and
initiate sending, to another network node comprised in the wireless communications network, another indication, the another indication being configured to indicate the log configured to be received.

32. The first network node of claim 26:
wherein the information is a first information; and
wherein a type of information of the first information comprises one or more indicators of at least one of:
   an identifier for each of the beams in the first set of beams;
   a cell identifier associated with each of the beams in the first set of beams,
   an identifier of the one or more network nodes configured to transmit each of the beams in the first set of beams,
   a strength of a signal in a beam;
   a quality of a signal in a beam;
   a timing advance used when transmitting in uplink; and
   an interference level.

33. The first network node of claim 26:
wherein the information is a first information; and
wherein the log comprises second information regarding, in the period of time, at least one of:
   a speed of the wireless device;
   a type of reference signals configured to be detected by the wireless device; and
a number of reference signals of a certain type configured to be detected by the wireless device.

* * * * *